(12) United States Patent
Aardahl et al.

(10) Patent No.: US 7,220,396 B2
(45) Date of Patent: May 22, 2007

(54) PROCESSES FOR TREATING HALOGEN-CONTAINING GASES

(75) Inventors: Christopher L. Aardahl, Sequim, WA (US); Rick J. Orth, Kennewick, WA (US); Kenneth G. Rappé, Richland, WA (US); Delbert L. Lessor, Richland, WA (US); Gary B. Josephson, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 129 days.

(21) Appl. No.: 10/341,783

(22) Filed: Jan. 13, 2003

(65) Prior Publication Data

US 2003/0161774 A1 Aug. 28, 2003

Related U.S. Application Data

(63) Continuation-in-part of application No. 09/905,654, filed on Jul. 11, 2001, now Pat. No. 6,962,679.

(51) Int. Cl.
*B01D 53/50* (2006.01)

(52) U.S. Cl. .................. 423/240 R; 588/311; 588/312; 588/406

(58) Field of Classification Search ............ 423/240 R, 423/241; 588/248, 227, 228, 210, 212, 213, 588/311, 312, 317, 319, 406, 415
See application file for complete search history.

(56) References Cited

U.S. PATENT DOCUMENTS

| | | | |
|---|---|---|---|
| 4,438,706 A * | 3/1984 | Boday et al. ............... | 588/311 |
| 4,489,041 A | 12/1984 | Wong et al. | |
| 4,644,877 A * | 2/1987 | Barton et al. .............. | 588/227 |
| 5,187,344 A | 2/1993 | Mizuno et al. | |
| 5,560,844 A | 10/1996 | Boulos et al. | |
| 5,637,127 A * | 6/1997 | McLaughlin et al. ...... | 65/134.8 |
| 5,750,823 A * | 5/1998 | Wofford et al. ............ | 588/210 |
| 5,817,284 A | 10/1998 | Nakano et al. | |
| 5,843,288 A | 12/1998 | Yamamoto | |
| 5,965,786 A | 10/1999 | Rostaing et al. | |
| 5,980,701 A | 11/1999 | Sharma et al. | |
| 6,187,072 B1 | 2/2001 | Cheung et al. | |
| 6,193,934 B1 | 2/2001 | Yang | |
| 6,290,918 B1 | 9/2001 | Rostaing et al. | |
| 6,423,284 B1 | 7/2002 | Arno et al. | |
| 6,962,679 B2 * | 11/2005 | Josephson et al. .......... | 423/241 |
| 2002/0033377 A1 | 3/2002 | Namose | |
| 2003/0012718 A1 | 1/2003 | Josephson et al. | |
| 2004/0001787 A1 | 1/2004 | Porshnev et al. | |
| 2004/0131524 A1 | 7/2004 | Josephson et al. | |
| 2005/0002842 A1 | 1/2005 | Duncan et al. | |

FOREIGN PATENT DOCUMENTS

| | | |
|---|---|---|
| EP | 0 820 801 A1 | 7/1997 |
| EP | 1 224 964 A1 | 3/2001 |
| JP | 10028836 | 2/1998 |
| WO | WO 01/12300 A1 | 2/2001 |

OTHER PUBLICATIONS

Evans et al., "Plasma remediation of trichloroethylene in silent discharge plasmas," *J. Appl. Phys.* 74: 9 pp. 5378-5387 (1993), no month.
Flippo et al., Abatement of Flourine Emissions Utilizing an ATMI CDO™ Model 863 with Steam Injection (2001), no month.
Grothaus et al., "Harmful Compounds Yield to Nonthermal Plasma Reactor," SwRI Technology Today, http:www.swri.rg, pp. 1-9 (published in *Technology Today*, Spring 1996), no month.
International Sematech disclosure, "Evaluation of a Litmas "Blue" Point-of-Use (POU) Plasma Abatement Device for Perflourocompound (PFC) Destruction," Technology Transfer No. 98123605A-Eng (Dec. 15, 1998).
Lester, "Clean Processing. No More PFC Emissions in Plasma Chamber Cleaning?" *Semiconductor*, p. 46 (2000), no month.
Rosenthal et al., "Corona Discharge for Surface Treatment," *IEEE Trans. Ind. Appln.*, 1-5, 328-335 (1975), no month.
Timms et al., "The chemistry of volatile waste from silicon wafer processing," *J. Chem. Soc.*, pp. 815-822 (1999), no month.
Vartanian et al., "Plasma Abatement Reduces PFC Emission," *Semiconductor International*, pp. 191-198 (2000), no month.

* cited by examiner

*Primary Examiner*—Edward M. Johnson
(74) *Attorney, Agent, or Firm*—Klarquist Sparkman, LLP

(57) ABSTRACT

There are disclosed various processes, apparatuses and systems for treating a halogen-containing gas such as $F_2$ that involve generating a plasma in order to reduce chemically the halogen-containing gas into products that are more environmentally manageable. According to a particular embodiment, a reducing agent is mixed with the halogen-containing gas to produce a feed gas mixture and a non-thermal plasma is generated in the feed gas mixture in the presence of liquid water. According to another embodiment, a vaporized portion of a liquid reducing agent is mixed with the halogen-containing gas to produce a reaction mixture and a non-thermal plasma is generated in the reaction gas mixture to reduce the halogen-containing gas.

22 Claims, 8 Drawing Sheets

PROCESSES FOR TREATING HALOGEN-CONTAINING GASES

PRIORITY CLAIM

This application is a continuation-in-part of pending U.S. application Ser. No. 09/905,654, which has been assigned a filing date of Jul. 11, 2001 now U.S. Pat. No. 6,962,679.

FIELD OF THE DISCLOSURE

The present disclosure relates to processes and apparatuses for treating halogen-containing gas, particularly fluorine gas.

BACKGROUND

Halogen-containing gases are environmental hazards and must be removed or reduced from emission sources. Treatment of fluorine gas ($F_2$) is especially problematic since it is only marginally soluble in water and, thus, cannot be efficiently removed from an effluent stream via water scrubbing. The solubility in water is also poor for other halogen-containing gases such as trichloroethylene, chloroform, perchloroethylene, various chlorofluorocarbons ("CFCs"), and various perfluorinated carbons ("PFCs"). Effluent streams from semiconductor manufacturing often contain such halogen-containing gases. $F_2$ is of particular interest since it is becoming more common as an emission product from $NF_3$-based dielectric chamber cleaning processes.

Conventional treatment of $F_2$ gas involves combustion with a fuel gas (e.g., natural gas or butane) at 700-800° C. in a burn box resulting in the formation primarily of hydrogen fluoride (HF), carbon dioxide ($CO_2$) and water. In addition to the high heat requirements and the need for a fuel gas, the conventional treatment method suffers from corrosion problems since the formed HF is highly corrosive at such high temperatures.

An alternative thermal process for destroying $F_2$ involves reacting the $F_2$ gas with steam in the presence of an oxidation source (e.g., air) (see Flippo et al., "Abatement of Fluorine Emissions Utilizing an ATMI CDO™ Model 863 with Steam Injection" (http://www.semiconductorsafety.org/meetings/proc2001/20.pdf)). According to this article, the steam acts as a reducing agent for reducing the $F_2$ gas into HF.

Treatment of various halogen-containing gases other than $F_2$ via plasma reactions have also been disclosed. For example, U.S. Pat. No. 5,187,344 describes decomposing CFCs or trichloroethylene by reacting the CFC or trichloroethylene with water in the presence of a thermal plasma. U.S. Pat. No. 6,187,072 B1 describes oxidizing PFCs under plasma conditions to produce $F_2$. Grothaus et al., "Harmful Compounds Yield to Nonthermal Plasma Reactor", Technology Today, (pub. Southwest Research Institute Spring 1996) describes treating $NF_3$ by adding $H_2$ gas and passing the resulting mixture through a pulsed corona non-thermal plasma reactor. The products were said to be $F_2$ and HF.

So-called "point-of-use" plasma abatement of PFCs in semiconductor processing effluent streams has also been described (see, e.g., Vartanian et al., "Plasma Abatement Reduces PFC Emission", Semiconductor International, June 2000, (hereinafter "Vartanian") and "Evaluation of a Litmas "Blue" Point-of-use (POU) Plasma Abatement Device for Perfluorocompound (PFC) Destruction", International SEMATECH, Technology Transfer #98123605A-ENG (1998) (hereinafter "SEMATECH disclosure"). Point-of-use abatement involves placing a high-density plasma source ($n_e > 10^{12}/cm^3$) in the foreline of a process tool between the turbomolecular and dry pumps. Both Vartanian and the SEMATECH disclosure mention that $H_2$ could be an additive gas in the plasma.

Despite these efforts, a need continues to exist for efficient methods and apparatuses for treating halogen-containing effluent gases that operate at low temperature and atmospheric pressure. Such a need particularly exists for halogen-containing gases that are only marginally soluble in water such as $F_2$.

SUMMARY OF THE DISCLOSURE

Halogen-containing gases are commonly-occurring emissions from manufacturing or cleaning processes such as etching in semiconductor manufacturing or metal cleaning in automobile manufacturing. Fluorine-laden gases are also a major byproduct from aluminum smelting. The disclosed processes and apparatuses offer an efficient abatement option for substantially decreasing or eliminating the amount of halogen-containing gas released into the atmosphere by industry.

In particular, there are disclosed various processes for treating a halogen-containing gas such as $F_2$ that involve generating a plasma in order to chemically reduce the halogen-containing gas into products that are more environmentally manageable.

A first embodiment involves providing a treatment gas that includes at least one halogen-containing gas, mixing at least one gaseous reducing agent with the treatment gas resulting in a feed gas mixture, and generating a non-thermal plasma in the feed gas mixture in the presence of a liquid to reduce the halogen-containing gas. The non-thermal plasma may be a silent discharge plasma according to one variant of the first embodiment.

A second embodiment involves providing a treatment gas that includes at least one halogen-containing gas, mixing at least one gaseous reducing agent with the treatment gas resulting in a feed gas mixture, and generating a plasma in the feed gas mixture in the presence of liquid water to reduce the halogen-containing gas.

A third embodiment involves introducing a halogen-containing gas and a gaseous reducing agent into a chamber, introducing a liquid into the chamber, generating a non-thermal plasma in the chamber to reduce the halogen-containing gas, and exhausting the resulting reduction product from the chamber. According to one variant of the third embodiment, the chamber contains at least one electrode and the liquid flows as a film over at least a portion of the electrode.

A fourth embodiment involves providing a chamber defining at least one gas inlet for receiving a feed gas mixture that includes a halogen-containing gas and a gaseous reducing agent, and at least one water inlet for receiving liquid water; providing at least one first electrode disposed within the chamber; providing at least one second electrode disposed within the chamber; flowing the liquid water over at least a portion of the first electrode; and applying electric potential to the first and second electrodes so as to generate a plasma in the feed gas mixture and reduce the halogen-containing gas. According to one variant of the fourth embodiment, the first electrode defines at least one second gas inlet for introducing the gaseous reducing agent through the liquid water and into the chamber so as to mix with the halogen-containing gas and form a feed gas mixture.

There is also disclosed a further embodiment for treating fluorine gas that contemplates providing a treatment gas that includes fluorine gas, mixing at least one reducing agent with the treatment gas resulting in a feed gas mixture, and generating a non-thermal plasma in the feed gas mixture to convert the fluorine gas to hydrogen fluoride gas.

Water-soluble gaseous reduction products resulting from these disclosed processes can be dissolved in water for further treatment or recycling rather than discharged into the atmosphere. For example, $F_2$ gas is only marginally soluble in water. In contrast, the HF gas produced by reduction of $F_2$ gas is water-soluble and is easily removable from a gas stream via scrubbing.

The liquid present during generation of the plasma can serve a number of purposes. First, it absorbs a significant amount of the heat generated by the exothermic reduction reaction. Accordingly, the operating bulk gas temperatures during the plasma generation do not exceed about 100° C. in many variants of the disclosed processes. Thus, the corrosive effect of the gas phase reduction products is substantially diminished compared to the corrosive effect at the 700 to 800° C. operating temperatures of the conventional combustion process. Second, if the liquid is water, the water-soluble gaseous reduction products can dissolve in the water that is present in the plasma reactor. Thus, scrubbing of the reduction product stream can be substantially completed, or at least initiated, in the plasma reactor. Third, the liquid can be the source of the reducing agent that reacts with the halogen-containing gas. For example, the liquid may be vaporized to produce a gaseous reducing agent that can be mixed with the treatment gas as described above.

One embodiment of a process for treating a halogen-containing gas utilizing a liquid reducing agent involves introducing a halogen-containing gas and a liquid reducing agent into a chamber. A portion of the liquid reducing agent is vaporized in the chamber and a non-thermal plasma is generated in the chamber to reduce the halogen-containing gas.

Also disclosed is a novel plasma reactor apparatus that includes a chamber defining at least one first gas inlet for receiving a first gas, and at least one water inlet for receiving liquid water; at least one first electrode disposed within the chamber and defining a first surface that is in fluid communication with the water inlet for receiving liquid water, and at least one second gas inlet for receiving a second gas; and at least one second electrode disposed within the chamber and opposing the first surface of the first electrode; wherein a dielectric barrier is disposed on the first surface of the first electrode and/or a surface of the second electrode. Another embodiment of a novel plasma reactor apparatus includes a chamber; means for generating a non-thermal plasma in the chamber that includes at least one electrode; means for introducing a liquid over at least a portion of the electrode; and means for bubbling or introducing a first gas through the liquid and into the chamber for reaction in the non-thermal plasma.

A further disclosure concerns a system for treating a halogen-containing gas that includes a plasma reactor for reducing halogen-containing gas, a halogen-containing gas source in fluid communication with the plasma reactor, a reducing agent source in fluid communication with the plasma reactor, and a liquid source in fluid communication with the plasma reactor.

The foregoing features and advantages will become more apparent from the following detailed description of several embodiments that proceeds with reference to the accompanying figures.

BRIEF DESCRIPTION OF THE DRAWINGS

Certain embodiments are described below with reference to the following figures.

DETAILED DESCRIPTION OF SEVERAL EMBODIMENTS

Figure 1:
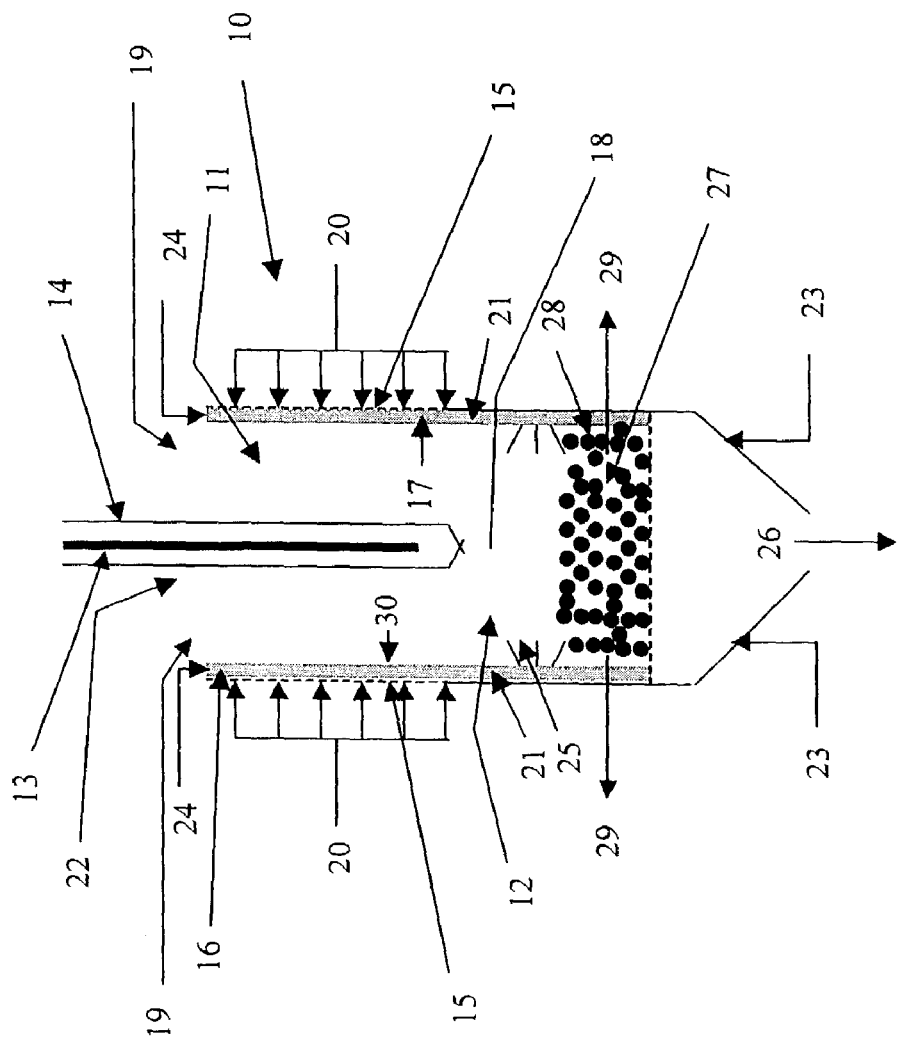
FIG. 1 is a sectional view of one embodiment of a novel non-thermal, film discharge plasma reactor for use in the disclosed processes.

The following definitions are provided for ease of understanding and to guide those of ordinary skill in the art in the practice of the embodiments.

"Ambient pressure and temperature" mean pressures and temperatures that typically exist in an environment without any external controls or energy such as a vacuum or heating. Typically, ambient pressure is approximately atmospheric pressure and ambient temperature is approximately room temperature (i.e., about 20 to about 30° C.).

"Non-thermal plasma" denotes a plasma having species and electrons at very different temperatures. In contrast, a "thermal plasma" denotes a plasma whose species and electrons are at about the same temperature.

"Treatment gas" encompasses any gas or gas mixture that includes at least one constituent that can be destroyed or converted to a more environmentally manageable species via the disclosed processes or apparatuses.

Halogen-containing gases that may be treated with the disclosed processes and apparatuses include fluorine gas ($F_2$) and fluorine-containing gases (e.g., PFC, and fluorides such as $NF_3$, $C_2F_6$, $CF_4$, $SiF_4$ and $SF_6$), chlorine-containing gases (e.g., $Cl_2$, trichloroethylene, chloroform, $SiCl_4$, $SiCl_2H_2$, and perchloroethylene), fluorochloro-containing gases (e.g., CFCs), bromine-containing gases (e.g., $Br_2$ and brominated hydrocarbons), and iodine-containing gases (e.g., iodated hydrocarbons). The disclosed processes and apparatuses are particularly suitable as a viable alternative to water scrubbing for gases that are only marginally soluble in water such as $F_2$, trichloroethylene, chloroform, perchloroethylene, various CFCs and various PFCs.

The treatment gas may include a mixture of different halogen-containing gases and, optionally, non-halogenated gases such as nitrogen ($N_2$) and inert gases that do not act as significant reducing or oxidizing agents (e.g., Ar). Oxygen is another optional component of the treatment gas. The amount of halogen-containing gas in the treatment gas mixture may vary, for example, from about 0.000001 volume % to about 25 volume %.

The reducing agent may be any material capable of donating hydrogen or an electron to the halogen-containing gas to effectuate reduction of the halogen-containing gas. Illustrative reducing agents include $H_2$, hydrocarbons, ammonia, hydrazines, hydrides (e.g., $B_2H_6$ and $LiAlH_4$), amines (e.g., ethylamine and butylamine), amides (e.g., urea and acetamide), water and similar hydrogen-rich materials. Mixtures of such reducing agents could also be employed. An inert gas may also be mixed with the reducing agent gas. The reducing agent should be in the form of a gas when it is mixed with the treatment gas. However, a liquid reducing agent could be initially provided and then subsequently vaporized for mixing with the treatment gas. The liquid reducing agent can be vaporized, for example, by absorbing heat from the exothermic reduction reaction, absorbing heat from the reactor (the reactor may be heated via power deposition that occurs during plasma generation), or by providing heating means in the plasma chamber. A minimal amount of vaporized liquid reducing agent sufficient for initiating the reduction reaction may be present in the plasma reactor without the need for any external heating. Illustrative liquid reducing agents include water; high vapor pressure (e.g., at least about 0.1 mm Hg) hydrocarbons such as alcohols (e.g., $C_2$-$C_6$ alkanols such as ethanol and isopropanol), ketones (e.g., $C_2$-$C_6$ alkyl ketones such as acetone, methyl ethyl ketone, and diethyl ketone), and alkanes (e.g., $C_6$-$C_{12}$ alkyls such as hexane, heptane, octane, and nonane); and olefins (e.g., alkenes such as hexene and heptene). In addition, a gaseous or solid reducing agent could be initially dissolved in a carrier liquid and then vaporized or released from the carrier liquid for the plasma reaction. For example, an ammonia or hydrazine reducing agent could be dissolved in water. Such gas-containing or solid-containing liquids are also referred to herein as "liquid reducing agents." According to a particular embodiment, the reducing agent is $H_2O$ vapor when the halogen-containing gas is $F_2$. In certain variants, a liquid reducing agent (such as $H_2O$) that is vaporized is the only reducing agent that is present.

According to certain embodiments, a non-aqueous, gaseous reducing agent is mixed with the treatment gas. A non-aqueous, gaseous reducing agent may substantially reduce the amount of electrical energy required to fully reduce the halogen-containing gas. According to an alternative embodiment, the reducing agent is $H_2$ when the halogen-containing gas is $F_2$.

The relative amount of reducing agent mixed with the halogen-containing gas may vary considerably. According to a particular embodiment, the relative amount may vary from about 0.5:1 to about 4:1 $H_2$:halogen atom molar ratio. In the case of $H_2$ as the reducing agent and $F_2$ as the halogen-containing gas, the molar ratio may be about 1:1 (which equates to 1:1 by volume concentration ratio). In particular, the volume concentration of $H_2$ introduced into the $F_2$-containing treatment gas may be at least equal to the volume concentration of $F_2$. Avoiding possible explosive conditions is also a consideration in the $F_2/H_2$ mix ratio. Options for eliminating explosive conditions may include diluting the $H_2$ with an inert gas, adding $H_2$ gradually to the $F_2$-containing stream, and adding excess $H_2$ above the amount that could be consumed in the reduction reaction.

In the case of $H_2O$ as the reducing agent and $F_2$ as the halogen-containing gas, the molar ratio of hydrogen atom: fluorine atom in certain embodiments may be about 0.5:1 to about 2:1.

The reducing agent may be mixed with the halogen-containing gas in any suitable manner. Complete mixing may be achieved prior to generating the plasma. Alternatively, the reducing agent may be gradually mixed with the halogen-containing gas during plasma generation. Such gradual mixing may reduce exothermic heat generation and assist in avoiding explosive conditions. The mixing may be accomplished with any known mixing procedures or devices such as, for example, static mixing, nozzles, baffles or a packed bed.

The temperature and pressure of the treatment gas and the reducing agent at the point of mixing are not critical. The treatment gas, for example, can be at the temperature and pressure that exist in the effluent stream from any processing module. Typically, the treatment gas and the reducing agent are at ambient temperature and pressure.

Although not bound by any theory, it is believed that the reducing agent reduces the halogen-containing gas via a reaction involving generating a hydrogen radical (H.) in the presence of the plasma. The hydrogen radicals dissociate a free halide gas (e.g., $F_2$) or react with a halogen atom in a halogenated hydrocarbon. By way of example, a disassociative reduction pathway is illustrated below with reference to $F_2$ reduction by $H_2$ in a non-thermal reactor in the presence of water.

$$e^- + F_2 \rightarrow 2F. \tag{1}$$

$$e^- + H_2 \rightarrow 2H. \tag{2}$$

$$H. + F_2 \rightarrow HF + F. \tag{3}$$

$$F. + H_2 \rightarrow HF + H. \tag{4}$$

$$F. + H_2O \rightarrow HF + .OH \tag{5}$$

$$.OH + H_2 \rightarrow H_2O + H. \tag{6}$$

If the reducing agent is $H_2$, a chain reaction is propagated (see reactions (3) and (4) above). If the reducing agent is $H_2O$ rather than $H_2$, the plasma ($e^-$) generates H. radicals from the $H_2O$ resulting in greater energy consumption.

The chain propagation depicted above, in essence, provides a continuous source of hydrogen radicals that requires less energy to generate than in the case of employing water alone as the reducing agent. It should be noted that reactions (5) and (6) are optional since the presence of water is not required in all of the disclosed embodiments.

Other possible specific reductions and reduction products include:

$$CFCs + H_2 \rightarrow HF + HCl + \text{completely or partially dehalogenated hydrocarbons}$$

$$H_2 + SiF_4 \rightarrow HF + \text{silane or various fluorosilanes}$$

$$CCl_4 + H_2 \rightarrow HCl, \text{methane and various chloromethanes}$$

It is also possible to add $O_2$ to the feed gas mixture in the plasma in these reductions to oxidize the hydrocarbons. The complete reactions then would be:

$$CFCs + H_2 + O_2 \rightarrow HF + CO_2 + H_2O + HF + HCl$$

$$SiF_4 + H_2 + O_2 \rightarrow HF + H_2O + SiO_2$$

$$CCl_4 + H_2 + O_2 \rightarrow HCl + H_2O + CO_2$$

Reduction of other halogen-containing feed gas can result in a variety of additional gaseous reduction products.

According to certain embodiments of the processes, at least one of the reduction products for each particular halogen-containing treatment gas is substantially water-soluble or at least more water-soluble than the halogen-containing treatment gas. Such water-soluble gaseous reduction products can be dissolved in water for further treatment. For example, HF gas can be scrubbed and the resulting HF-containing water can be neutralized with a base. One particular neutralization method for HF acid involves treating the HF acid in a calcium or sodium alkaline scrubber to produce calcium or sodium fluoride. The calcium or sodium fluoride may be subsequently processed and sent to a landfill or used as an additive for dental treatments. Other separation techniques such as a water bubbler or water spray contactor may also be used for removing gaseous reduction products that are not intended for emission into the atmosphere. As described in more detail below, the scrubbing of the gaseous reduction product may occur at least partially within the plasma reactor. Alternatively, the scrubbing may be performed downstream from the plasma reactor in a separate unit. Such scrubbing is well-known and any suitable devices or processes may be used.

The liquid present during the plasma generation and reduction reaction may be any liquid that has heat absorbing and gas-solvating characteristics. According to certain embodiments, this liquid can also serve as the source for the reducing agent. Illustrative heat-absorbing liquids include those that have a low boiling point such as, for example, less than about 150° C. and a high heat of vaporization such as, for example, at least about 35 kJ/mole. Additional liquids include the liquid reducing agents identified above. Water is the typical liquid, but other liquids such as alcohols, light oils, waxes or other hydrocarbons may be used. When $F_2$ is the treatment gas the water may include particles of calcium hydroxide in the form of a slurry or may be a solution of sodium hydroxide. Calcium hydroxide and sodium hydroxide react with HF and, thus, would promote additional scrubbing of the HF from the product gas stream in the plasma reactor.

The heat absorbed by the liquid causes at least a portion of the liquid to evaporate into the gas phase (e.g., steam in the case of water). This heat absorption/evaporation mechanism prevents significant increases in the temperature of the bulk gas mixture undergoing treatment. For example, in certain embodiments the temperature of the bulk gas mixture does not exceed about 100° C. Since no heat is externally applied, the overall operating conditions of these embodiments does not exceed about 100° C.

If the liquid is a reducing agent, liquid vapor generated by the evaporation can mix with the halogen-containing gas and react to reduce the halogen-containing gas. Typically, only a portion of the liquid, rather than substantially all of the liquid, is evaporated for reducing the halogen-containing gas. The remaining portion of the liquid, therefore, is available for additional heat absorption and solvating of the water-soluble reaction products. Evaporation of the liquid in the plasma chamber also results in more gradual mixing of the reducing agent vapor with the treatment gas. Slower mixing of the reducing agent minimizes the explosion risk, and reduces the maximum temperature encountered in the plasma reactor system. The amount of evaporation can be controlled, for example, by appropriately adjusting the temperature of the treatment gas that is in contact with the liquid and/or the temperature of the liquid. The temperature of the liquid may be controlled, for example, by preheating the liquid prior to its introduction into the plasma chamber or by heating a surface in the plasma chamber over which the liquid flows.

The plasma may be generated by any energy supply source known in the art. For example, the plasma could be energized by radio frequency (RF), microwave, laser, electrical discharge, or a combination thereof. Myriad reactor configurations are known for each type of plasma and any such geometry may be suitable for effecting the disclosed processes. According to particular embodiments of the disclosed processes, the plasma is a non-thermal plasma.

A basic distinction between non-thermal plasmas and thermal plasmas is described above. Other possible characteristics of non-thermal plasmas are that some non-thermal reactors have a relatively small footprint since they operate at atmospheric pressure. In addition, the power sources are relatively simple AC or DC sources.

The plasma operating conditions may vary depending upon the type of plasma employed. Non-thermal plasmas typically operate from sub-ambient temperature up to at least about 600° C., but the temperature of the bulk gas in the plasma may vary depending on the temperature of the incoming feed gas or as the result of any enthalpy released from the chemical reactions occurring in the plasma. For example, the disclosed reduction of $F_2$ is an exothermic reaction and, thus, the temperature of the bulk gas in the plasma may rise to about 500 or 600° C. However, this temperature can be reduced to less than or equal to about 100° C. by generating the plasma in the presence of a liquid that can absorb the heat as described below in more detail.

The operating pressure for non-thermal plasmas may vary. For example, glow discharge non-thermal pressures typically operate at subatmospheric pressures such as, for example, about 1 mTorr to about 50 Torr. Silent discharge reactors and pulsed-DC reactors (described below in more detail) typically operate at slightly sub-ambient to slightly above-ambient pressure such as, for example, about 0.5 atmospheres to about 10 atmospheres. The power required to generate the non-thermal plasma may vary depending upon the feed gas flow rate and the type of halogen-containing gas undergoing treatment. It is known that, in general, the specific power may be calculated by the equation: (volume flow rate×energy/volume=power). For example, in the embodiment of about 1:1 $H_2$:$F_2$ volume % in the feed gas stream, substantially complete reduction of $F_2$ occurs at about 80 to about 150 J/L feed gas. This equates to approximately 1 kW of power required per 400 L/minute of feed gas. In the embodiment of $H_2O$ as the reducing agent, based on calculated estimates, an energy deposition of about 10-20 kJ/L feed gas may be required, which equates to about 56 kW of power to treat 400 L/minute of feed gas.

Although any type of non-thermal plasma-generating system may be utilized for the disclosed processes, there are two types that may be especially suitable since they are capable of generating non-thermal plasmas at ambient pressure. These two non-thermal plasma-generation systems are referred to herein as a silent discharge reactor (also known in the art as "dielectric barrier discharge reactor") and a pulsed-DC reactor, respectively. The general geometry and operation of such reactors is described below. An additional, particularly useful, plasma reactor embodiment is referred to herein as a "film discharge reactor". It should be recognized that film discharge reactors may be useful regardless of the type of plasma-generation system employed. In other words, a silent discharge system may be combined with film discharge reactor geometry resulting in a silent-discharge, film reactor. The general geometry and operation of a film discharge reactor is also described below.

In a silent discharge reactor, at least one high voltage electrode is located a distance from at least one opposing ground electrode. The gaps between the high voltage electrodes and the opposing ground electrodes define a passage through which a gas flows. A dielectric material is disposed on the surface of the high voltage and/or ground electrodes. A voltage is applied to the high voltage electrode to generate a non-thermal plasma discharge in the gap between the high voltage electrode and the ground electrode. The non-thermal plasma is maintained by applying an AC voltage to the high voltage electrode.

In a pulsed-DC reactor, a high voltage electrode is located a distance from an opposing ground electrode. The gap between the high voltage electrode and the opposing ground electrode defines a passage through which a gas flows. There is no dielectric material disposed on any surface. A voltage is applied to the high voltage electrode to generate a non-thermal plasma discharge in at least a portion of the gap between the high voltage electrode and the ground electrode. The non-thermal plasma is maintained by applying a pulsed DC voltage to the high voltage electrode. The pulsed DC voltage ramps up and down very quickly (e.g., a nanosecond). In general, pulsed-DC reactor systems tend to be more expensive than silent discharge reactors due to the relatively elaborate power supply configuration required for pulsed-DC reactors.

In both the silent discharge reactor and the pulsed-DC reactor, when the electric field reaches a sufficient level, electrons are accelerated to the point that they will collide with, and ionize, gas molecules. Each such collision produces a charged molecule (i.e., ion) and one additional electron. This continuing process multiplies the number of electrons in the gap (referred to in the art as "avalanches"). In the case of a silent discharge reactor the avalanche (also known as "microstreamers") continues until it impacts a dielectric material barrier. The charge accumulation at the dielectric material barrier effectively quenches the avalanche, thereby avoiding formation of an arc or thermal plasma. When the AC polarity at the high voltage electrode reverses, the process repeats itself. In the case of a pulsed-DC reactor, the end of the DC pulse extinguishes each avalanche. The electrons generated in such plasmas react with the gases in the gap as described above.

In a film discharge reactor, a first electrode is located a distance from a film or body of liquid that contacts or immerses an opposing second electrode or a dielectric barrier disposed on the second electrode (referred to herein as the "wetted electrode"). The liquid film may be flowing over at least a portion of the boundary of the second electrode. Alternatively, the second electrode may be disposed in a liquid bath or reservoir that may or may not be flowing. The space between the first electrode and the opposing second electrode defines a passage through which a treatment gas flows. According to the disclosed processes, the treatment gas flows over the surface of the liquid and a plasma is generated in the gas region between the first electrode and the liquid surface, particularly at or near the surface of the liquid. The plasma radicals and the reduction products may contact the surface of the liquid. The liquid film in a film discharge reactor can absorb the heat generated by the exothermic reduction reaction, at least initially dissolve the water-soluble reaction products, and serve as the source of the gaseous reducing agent, as mentioned above.

The plasma can be generated in a device containing any type of geometrical-shaped electrodes. General classes of potential devices include parallel plate (horizontal or vertical) reactors, cylindrical plasma reactors, and reactors containing arrays of tubular electrodes. One example of a possible non-thermal, film discharge reactor configuration is shown in U.S. Pat. No. 5,980,701. A few particular embodiments of possible non-thermal, film discharge reactors are described below.

One embodiment of a non-thermal, film discharge reactor is shown in FIG. 1. A chamber 10 defines an upper portion 11, a lower portion 12, side wall 15, top wall 22, bottom wall 23, and an interior void 18. The chamber 10 depicted in FIG. 1 is cylindrical but it could be another shape such as conical or rectangular. At least one first electrode 13 is received within the upper portion 11 of the chamber 10. A dielectric barrier coating or sheath 14 may be provided on the surface of the first electrode 13. The dielectric barrier coating 14 may encapsulate all or a substantial portion of the first electrode 13. The first electrode 13 may be made from any type of conductive material known in the art such as, for example, graphite, vitreous carbon, stainless steel, or other metals, or a conductive salt solution. The dielectric barrier coating 14 may be made from any type of known dielectric material such as alumina, perfluorinated polyethylene, quartz, glass, or other metal oxides. In one approach, the first electrode 13 is formed from a hollow tube defining an interior cavity into which is disposed a conductive material fibrous matrix or mesh such as, for example, stainless steel wool. The walls of the hollow tube may be constructed from a dielectric material that functions as the dielectric barrier 14. The dielectric barrier coating 14 should be sufficiently thick to prevent dielectric breakdown of the dielectric material at the operating fields of the device. For example, the dielectric barrier coating may be a thin film (i.e., less then 0.1 mm thick) up to about 0.25 inches thick, with one range being about 1 to about 6 mm thick. The first electrode 13 coated with the dielectric barrier 14 may have any shape such as an elongated rod, a wire or an elongated plate.

At least one second electrode 16 is located at the side-walls 15 of the chamber 10. The second electrode 16 is disposed within the chamber 10 in the sense that it may define the side-walls 15 or it could be disposed on an inside surface 17 of the side-walls 15. The second electrode 16 may have any shape such as a tubular plate extending around the circumference of the cylindrical chamber 10, circular rods extending around the circumference of the cylindrical chamber 10, an elongated, substantially planar plate, or a porous material such as a fabric or foam-like material. Although not shown, the second electrode 16 may include a dielectric barrier coating or sheath.

According to the embodiment of FIG. 1 an AC voltage source (not shown) is operatively coupled to first electrode 13 and the second electrode 16 is grounded (or connected to a low voltage source (not shown)). Thus, first electrode 13 is the high voltage or "hot" electrode and the second electrode 16 is the ground electrode. Alternatively, the AC voltage source could be coupled to the second electrode 16 and the first electrode 13 could serve as the ground electrode. The first electrode 13 and the second electrode 16 are positioned in an opposing relationship so that an electric field can be generated in the void or gap between the first electrode 13 and the second electrode 16.

In general, the plasma reactor chamber defines at least one inlet for introducing a feed gas into the interior void of the chamber. According to one variant (not shown), there are only inlets for receiving a feed gas that is a mixture of the treatment gas and the reducing agent gas. In other words, the treatment gas and the reducing agent gas are pre-mixed prior to entering the plasma reactor chamber. Alternatively, the inlet(s) receives a feed gas that consists of only the treatment gas in embodiments in which the reducing agent is generated from the liquid film. According to another variant (depicted in FIG. 1), the treatment gas and the reducing agent are mixed in the plasma reaction chamber. Of course, premixing and inchamber mixing could both be used in a system.

In particular, there is at least one inlet 19 for introducing the treatment gas into the interior void 18 of the chamber 10. Inlet 19 may be located at any position in the chamber such as the top wall 22 of the chamber 10 as illustrated in FIG. 1 or in the bottom wall 23 of the chamber 10. Another option is to provide a first electrode 13 that defines pinholes for introducing the treatment gas. Inlet 19 is in fluid communication with a source of treatment gas.

There is also at least one optional inlet 20 for introducing the reducing agent into the interior void 18 of the chamber 10. Inlet 20 also may be located at any position in the chamber 10. In the FIG. 1 embodiment, the side-walls 15 and second electrode 16 define inlets 20. For example, the side-walls 15 and/or second electrode 16 can be made of a porous or foam-like material or they can define pinholes through which the reducing agent gas can flow. In the case of the side-walls 15, the porous material can be made of alumina, perfluorinated polyethylene (e.g., Teflon®), glass or other metal oxides. The inlets 20 may be arranged along the axial length of the cylindrical chamber 10 so that the reducing agent can be gradually introduced into the treatment gas stream as it flows through the chamber 10. Inlet 20 is in fluid communication with a reducing agent source.

The interior void 18 of the chamber 10 includes a liquid region 21 that is contiguous with the inside surface 17 of the side-walls 15 and partially fills the interior void 18. The liquid region includes a liquid surface 30 facing the interior void 18 of the chamber 10. A heat-absorbing liquid such as described above occupies liquid region 21 during operation of the plasma reactor. The liquid region 21 depicted in FIG. 1 is in the form of a liquid film that gravity flows along the inside surface 17 of the side-walls 15. The liquid film is maintained within liquid region 21 via surface tension. The inside surface 17 of the side-walls 15 may be provided with grooves or other types of texturing for promoting the uniformity of the liquid film.

Figure 2:
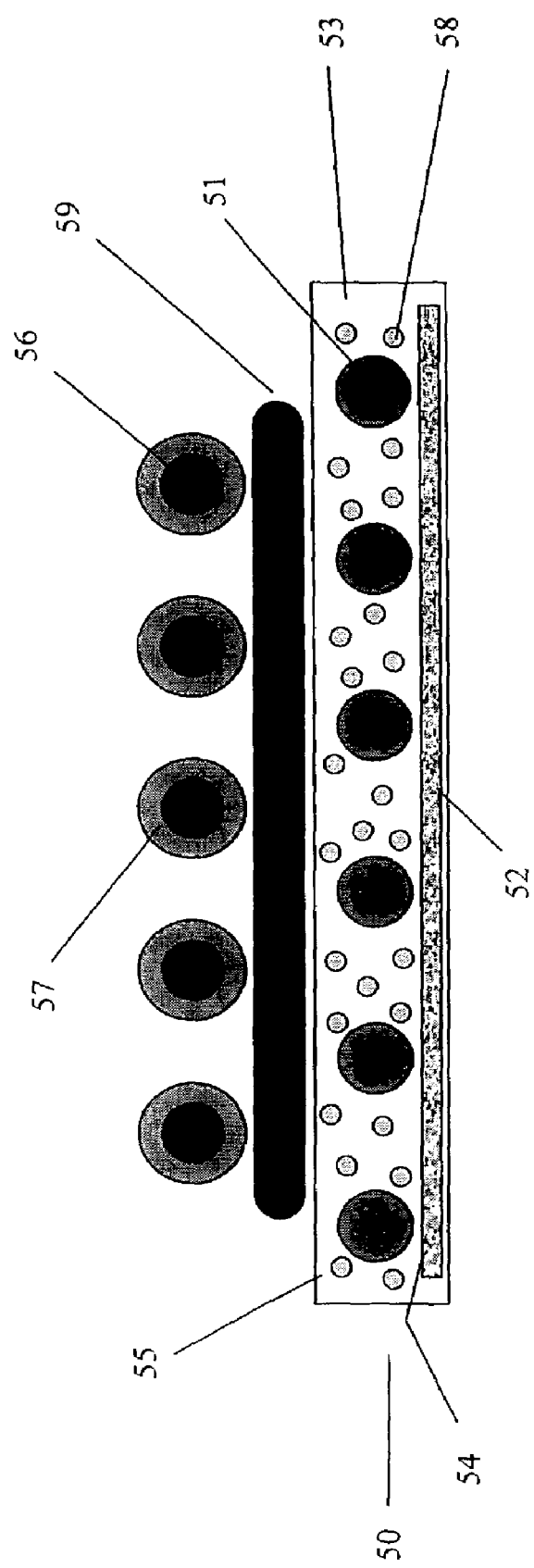
FIG. 2 is a sectional view of a first embodiment of a novel electrode arrangement in a non-thermal, film discharge plasma reactor for use in the disclosed processes.
Figure 3:
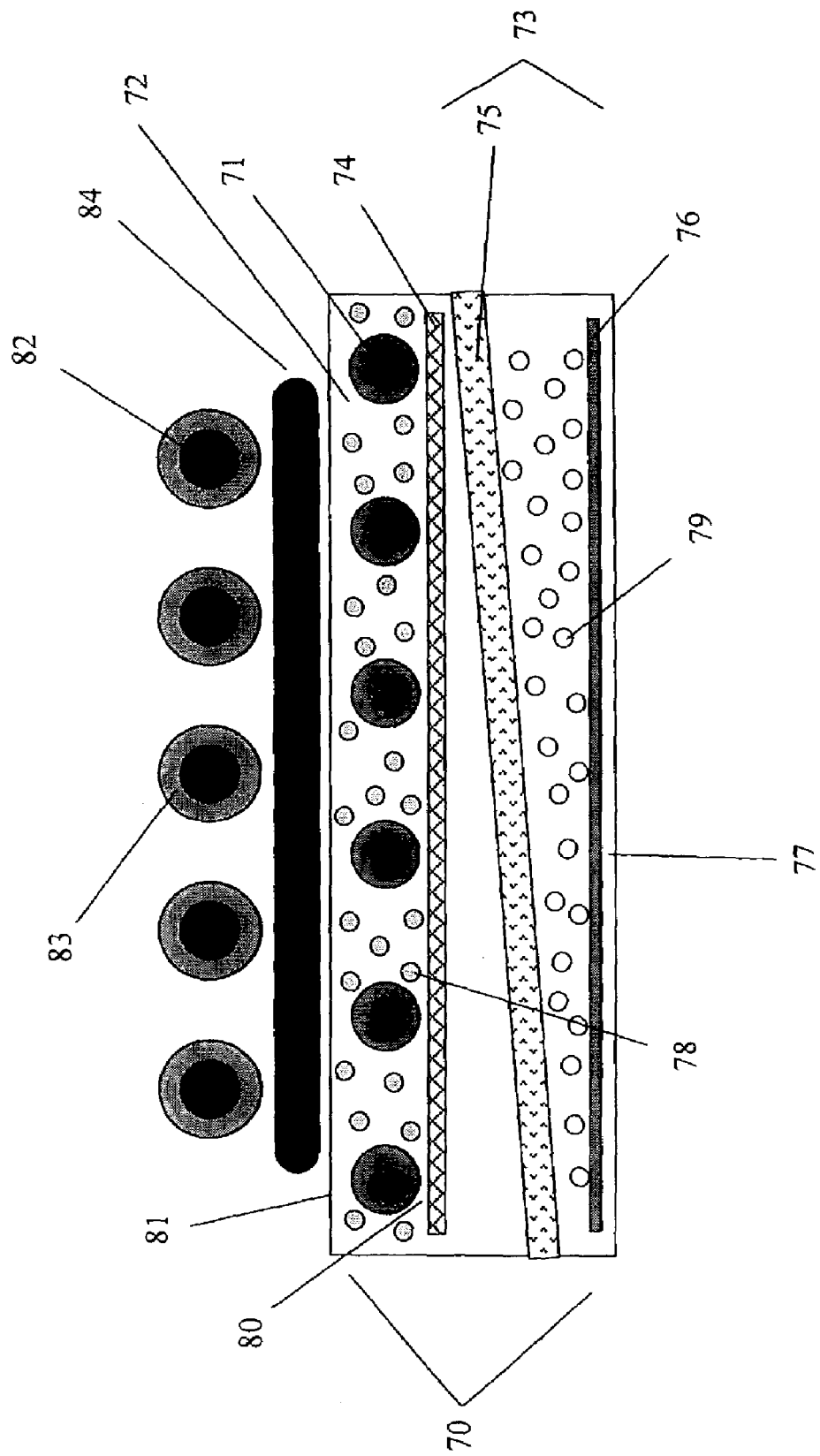
FIG. 3 is a sectional view of a second embodiment of a novel electrode arrangement in a non-thermal, film discharge plasma reactor for use in the disclosed processes.

Two examples of side-wall 15/liquid region 21 configurations are shown in FIGS. 2 and 3, respectively. Both FIGS. 2 and 3 illustrate horizontal electrode embodiments as opposed to the cylindrical vertical embodiment of FIG. 1. But the ground electrode, liquid region and reducing agent introduction arrangements depicted in FIGS. 2 and 3 may also be utilized for the side-wall 15/liquid region 21 of FIG. 1. In particular, the design in FIG. 2 is provided with a first section 50 that includes first electrodes 51, a diffuser 52 through which the reducing agent can flow, and a liquid region 53. The first section 50 is an example of a possible arrangement for the side-wall 15/liquid region 21 of FIG. 1. Similarly, the design in FIG. 3 is provided with a first section 70 that includes first electrodes 71, a liquid region 72, and an electrochemical cell 73 for producing a reducing agent gas. The embodiments shown in FIGS. 2 and 3 are described below in more detail.

Referring back to FIG. 1, the top wall 22 of the chamber 10 defines an inlet port 24 for introducing the liquid into the liquid region 21. The bottom wall 23 of the chamber 10 defines an outlet port 26 through which the liquid exits from the chamber 10.

The interior void 18 of the chamber 10 also may optionally include a gas-scrubbing region 27 that is populated with gas-scrubbing packing material 28. The gas-scrubbing packing material 28 may be any type of material that is known to provide increased surface area for gas/liquid exchange. Illustrative gas-scrubbing packing material particularly suitable for HF include perfluorinated polymeric materials such as perfluorinated polyethylenes or polyvinylidene fluoride. Liquid may be provided to the gas-scrubbing packing material 28 by draining the liquid from the liquid region 21 through the gas-scrubbing packing material 28. Optional liquid sprayers 25 may also be provided at the side-walls 15 of the chamber 10.

The chamber 10 also includes at least one outlet 29 for exhausting the product gas mixture from the chamber 10. The outlet 29 may be located at any position in the chamber 10 such as, for example, in the lower portion 12 of the chamber 10 as shown in FIG. 1. In a variant that has the treatment gas inlet 19 located in the lower portion 13 of the chamber 10, the exhaust or product gas outlet 29 typically is located in the upper portion 11 of the chamber 10.

During operation of the plasma reactor of FIG. 1 a treatment gas will flow through inlets 19 and then vertically down along the length of void 18 in the chamber 10. The treatment gas includes a halogen-containing gas such as $F_2$ and may include other gases such as $N_2$. A reducing agent gas such as $H_2$ may optionally flow through inlets 20 and into void 18 of the chamber 10. The reducing agent gas flowing through inlets 20 bubbles through the liquid in the liquid region 21 and mixes into the treatment gas stream forming a feed gas stream. A liquid such as water may also be flowing through the liquid region 21. The liquid flowing through the liquid region 21 may be the source of the reducing agent as described above. The liquid and the gas may be flowing in the same direction through the chamber 10 (i.e., co-current flow). The flow rate of the treatment gas, reducing agent gas, resulting feed gas mixture, and liquid may vary widely depending upon the desired amount of treatment gas for abatement. For example, the flow rate of the feed gas mixture through the chamber 10 may be from about 100 standard cubic centimeters per minute (seem) to about 1500 standard liters per minute. The minimum liquid flow rate for substantially complete wetting of the inside surface 17 of the side wall 15 may be about 0.03 kg/m-s and the maximum liquid flow rate to remain in a laminar regime of fluid flow is about 0.5 kg/m-s in the case of water.

Electric power will be supplied from the AC voltage source to the first electrode 13 to generate a non-thermal plasma in the feed gas mixture present in the gap between the first electrode 13 and the second electrode 16. The frequency applied to the first electrode 13 may vary depending upon the feed gas flow rate and halogen concentration. The applied frequency, for example, may range from about 30 Hz to about 5000 Hz, particularly about 50 Hz to about 1000 Hz. The voltage applied to the first electrode 13 may vary depending on the gap distance between the first electrode 13 and the second electrode 16, the types of gas in the feed gas, and the temperature and pressure of the system. The applied voltage should be sufficient to at least reach onset voltage as is understood in the art. As an example, a voltage of about 10 to about 30 kV may be applied to the first electrode 13 when the gas in the electrode gap is a mixture of $F_2$, $N_2$ and the reducing agent (e.g., $H_2$ and/or $H_2O$), and the electrode gap width is about 0.1 to about 3 cm. According to an illustrative embodiment when the plasma is generated at atmospheric pressure, the electrode gap width may be about 0.1 cm to about 0.8 cm. The electrode gap width may be substantially constant over the length of the reaction zone or it may vary, for example, by up to about 25%.

The reduction reaction in the plasma-excited feed gas mixture will occur at or near the interior surface 30 of the liquid region 21. Consequently, the exothermic heat from the reduction reaction will be absorbed by the liquid in the liquid region 21. The heat absorption may be sufficient to vaporize a portion of the liquid, but the continuous feed of flowing liquid will replace any vaporized portion. The vaporized liquid, if it is not a reducing agent that has reacted with the halogen-containing gas, enters the void 18 of the chamber 10 and is exhausted with the product gas stream via exhaust gas outlets 29. A portion of the liquid in the liquid region 21 may also be vaporized by a heating element (not shown) disposed within or adjacent to the second electrode 16. Other possible heating means include a jacket around the chamber 10. If the vaporized liquid is a reducing agent, the vapor can mix and react with the halogen-containing gas in the electrode gap.

At least a portion of the water-soluble gaseous reduction product (such as HF) formed in the void 18 of the chamber 10 will be scrubbed from the gas stream as it progresses down the vertical axial length of chamber 10. In particular, a portion of the gaseous reduction product may dissolve in the liquid of the liquid region 21 as it flows down the inside surface 17 of the side wall 15. A portion of the gaseous reduction product also dissolves in the liquid provided in the gas-scrubbing region 27.

The exhaust gas exiting through outlet 29 may include any reduction reaction product that was not removed from the scrubbing action in the chamber 10 (such as HF), non-reducible gases that were present in the treatment gas (such as $N_2$), and excess reducing agent (such as $H_2$). The liquid exiting through outlet port 26 may include dissolved reduction products (such as HF).

It will be appreciated that there could be variations of a cylindrical, non-thermal, film discharge reactor similar to that depicted in FIG. 1. For example, the treatment gas could flow into the chamber at the bottom of the chamber and the product gas exit at the top of the chamber. In such a variant, the liquid flowing down the inside surface 17 of the side wall 15 will be moving countercurrent to the flow of the gas. This may provide improved absorption of the reduction product into the liquid.

Another option is to not provide the scrubbing packing material 28 in the interior void 18 of the chamber. In this case, partial scrubbing of the reduction product in the liquid of the liquid region 21 likely will occur, but the product gas exhausting from the chamber will include a greater concentration of reduction product gas. Such remaining reaction product gas could simply be scrubbed in a downstream module.

As mentioned above, both FIGS. 2 and 3 illustrate examples of the electrode arrangement in horizontal, silent-discharge, film reactors. FIG. 2 depicts an embodiment wherein the reducing agent gas is supplied from a source (not shown) external to the reactor. FIG. 3 shows an alternative approach for supplying the reducing agent that involves integrating an electrochemical cell into the plasma reactor structure. Another possibility is to provide the plasma reactor with a $H_2$ reformer.

In particular, FIG. 2 depicts first electrodes 51 that are surrounded by a liquid 25 region 53. The liquid region 53 is bounded or supported on a lower side 54 by a diffuser 52. The liquid region 53 has an upper surface 55. Second electrodes 56 are located a distance above the upper surface 55 of the liquid region 53 in an opposing relationship relative to the first electrodes 51. A dielectric barrier coating or sheath 57 is disposed on the surface of second electrodes 56. The first and second electrodes 51 and 56, dielectric barrier 57, and liquid in the liquid region 53 may be comprised of the same materials as described above in connection with FIG. 1. The diffuser 52 may be made of any porous or foam-like material that includes microvoids for allowing passage of reducing agent gas molecules 58 to bubble into the liquid. In FIG. 2, first and second electrodes 51 and 56 are in the shape of cylindrical rods, but both or either electrodes 51 and 56 could have other shapes such as, for example, planar plates. If first electrode 51 is planar in shape it can be provided with pinholes or microvoids (such as in a porous material or mesh) for allowing passage of the reducing agent gas. It will be understood that the rod-shaped electrodes 51 and 56 have an axial length extending out from, and into, the plane of the drawing surface of FIG. 2.

It will be appreciated that the representation in FIG. 2 shows only a portion of a horizontal plasma reactor. First region 50 and second electrodes 56 may be housed inside a chamber. The rod-shaped electrodes 51 and 56, and the diffuser 52 may be connected to a wall of such chamber for support. The chamber, of course, would include inlets and outlets for the treatment gas, reducing agent gas, product or exhaust gas and the liquid. An AC voltage source (not shown) is operatively coupled to second electrodes 56 and the first electrodes 51 are grounded (or connected to a low voltage source (not shown)). Thus, second electrodes 56 are the high voltage or "hot" electrode and the first electrodes 51 are the ground electrodes. Alternatively, the AC voltage source could be coupled to the first electrodes 51 and the second electrodes 56 could serve as the ground electrodes. The first electrodes 51 and the second electrode 56 are positioned in an opposing relationship so that an electromagnetic field can be generated in the void or gap 59 between the first electrodes 51 and the upper surface 55 of the liquid region 53.

During operation a treatment gas will flow in the gap 59 and mix with reducing agent gas bubbling out of the upper surface 55 of the liquid flowing through the liquid region 53 to form a feed gas mixture. A silent discharge plasma will be generated in the feed gas mixture in the gap 59 to initiate and sustain the reduction of the halogen gas in the treatment gas. The resulting product gas then will exit the chamber via an exhaust gas outlet. The feed gas flow direction and liquid flow direction may both be parallel along the axial length of the electrodes 51 and 56 (i.e., co-current flow) or there may be countercurrent flow. Alternatively, the feed gas flow direction and the liquid flow direction may be perpendicular (or at some other angle) relative to the each other. In this case, either the feed gas flow direction or the liquid flow direction would be perpendicular or angled relative to the axial length of the electrodes 51 and 56.

FIG. 3 depicts first electrodes 71 that are surrounded by a first liquid region 72. An electrochemical cell 73 for generating a reducing agent such as $H_2$ is located adjacent to the first liquid region 72. The electrochemical cell 73 includes an electrochemical ground electrode 74, a membrane 75, and a cathode 76 and is immersed in a second liquid region 77 (e.g., water). The electrochemical cell 73 generates $H_2$ molecules 78 and $O_2$ molecules 79 based on well known principles. The membrane 75 may be angled relative to the plane of the cathode 76 to flow the $O_2$ molecules 79 in the direction indicated in FIG. 3. The electrochemical ground electrode 74 and cathode 76 may be made from any type of conductive material known in the art such as, for example, graphite, vitreous carbon, stainless steel, other metals, or a conductive salt solution. The membrane 75 may be made from any ion exchange material known in the art such as, for example, perfluorinated polymers (e.g., Nafion® available from E.I. du Pont).

Electrochemical ground electrode 74 partitions first liquid region 72 and second liquid region 77. The respective liquids in first liquid region 72 and second liquid region 77 may be the same or different. According to a particular embodiment, the liquid is water in both first liquid region 72 and second liquid region 77.

The first liquid region 72 may be bounded or supported on a lower side 80 by the electrochemical ground electrode 74. The first liquid region 72 has an upper surface. Second electrodes 82 are located a distance above the upper surface 81 of the first liquid region 72 in an opposing relationship relative to the first electrodes 71. A dielectric barrier coating or sheath 83 is disposed on the surface of second electrodes 82. The first and second electrodes 71 and 82, dielectric barrier 83, and liquid in the first liquid region 72 may be comprised of the same materials as described above in connection with FIG. 1. In FIG. 3, first and second electrodes 71 and 82 are in the shape of cylindrical rods, but both or either electrodes 71 and 82 could have other shapes such as, for example, planar plates. If first electrode 71 is planar in shape it can be provided with pinholes or microvoids (such as in a porous material or mesh) for allowing passage of the reducing agent gas. It will be understood that the rod-shaped electrodes 71 and 82 have an axial length extending out from, and into, the plane of the drawing surface of FIG. 3.

It will be appreciated that the representation in FIG. 3 shows only a portion of a horizontal plasma reactor. First region 70, second electrodes 82 and electrochemical cell 73 may be housed inside a chamber. The rod-shaped electrodes 71 and 82, and the electrochemical cell 73 parts may be connected to a wall of such chamber for support. The chamber, of course, would include inlets and outlets for the treatment gas, reducing agent gas, product or exhaust gas and the liquids. An AC voltage source (not shown) is operatively coupled to second electrodes 82 and the first electrodes 71 are grounded (or connected to a low voltage source (not shown)). Thus, second electrodes 82 are the high voltage or "hot" electrode and the first electrodes 71 are the ground electrodes. Alternatively, the AC voltage source could be coupled to the first electrodes 71 and the second electrodes 82 could serve as the ground electrodes. The first electrodes 71 and the second electrode 82 are positioned in an opposing relationship so that an electromagnetic field can be generated in the void or gap 84 between the first electrodes 71 and the upper surface 81 of the first liquid region 72. A DC power supply that operates at low voltage and moderate current may be coupled to the electrochemical cathode 76.

During operation a treatment gas will flow in the gap 84 and mix with reducing agent gas bubbling out of the upper surface 81 of the liquid flowing through the liquid region 72 to form a feed gas mixture. A silent discharge plasma will be generated in the feed gas mixture in the gap 84 to initiate and sustain the reduction of the halogen gas in the treatment gas. The resulting product gas then will exit the chamber via an exhaust gas outlet. The feed gas flow direction and liquid flow direction may both be parallel along the axial length of the electrodes 71 and 82 (i.e., co-current flow) or there may be countercurrent flow. Alternatively, the feed gas flow direction and the liquid flow direction may be perpendicular (or at some other angle) relative to the each other. In this case, either the feed gas flow direction or the liquid flow direction would be perpendicular or angled relative to the axial length of the electrodes 71 and 82.

Figure 4:
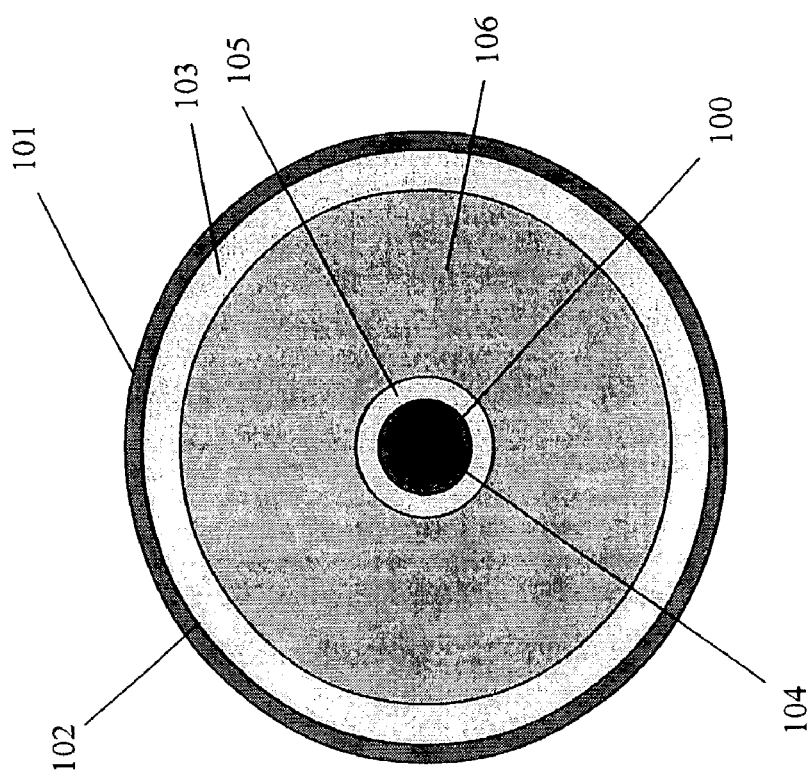
FIG. 4 is a sectional view of one embodiment of a non-thermal plasma reactor for use in the disclosed processes.

Another silent discharge plasma reactor that can be used to perform the disclosed processes is represented in FIG. 4. An inner cylindrical electrode 100 is received within an outer tubular electrode 101. The outer cylindrical electrode 101 defines an inner surface 102 that supports a first dielectric barrier 103. The inner cylindrical electrode 100 defines an outer peripheral surface 104 that supports a second dielectric barrier 105. The inner surface 102 of the outer electrode 101 and the outer surface of 104 of the inner cylindrical electrode 100 define an annular gap 106. According to another embodiment, only one of the first or second dielectric barriers 103, 105 is present. A dielectric packing material may be received within at least a portion of the annular gap 106. Illustrative dielectric packing materials include quartz, alumina, titania, other non-conductive ceramics, and fluorinated polymers. The electrodes 100 and 101 and the dielectric barriers 103 and 105 may be made with any of the materials described above in connection with the embodiments shown in FIGS. 1-3.

An AC voltage source (not shown) is operatively coupled to inner cylindrical electrode 100 and the outer tubular electrode 101 is grounded (or connected to a low voltage source (not shown)). Thus, inner cylindrical electrode 100 is the high voltage or "hot" electrode and the outer tubular electrode 101 is the ground electrode. Alternatively, the AC voltage source could be coupled to the outer tubular electrode 101 and the inner cylindrical electrode 100 could serve as the ground electrode. An electromagnetic field can be generated in the annular gap 106.

During operation a feed gas mixture that includes the treatment gas and the reducing agent gas enters the reactor through an inlet (not shown) and flows through the annular gap 106. A silent discharge plasma is generated in the feed gas mixture in the annular gap 106 to initiate and sustain the reduction of the halogen gas in the treatment gas. The resulting product gas then will exit the reactor via an exhaust gas outlet (not shown).

Figure 8:
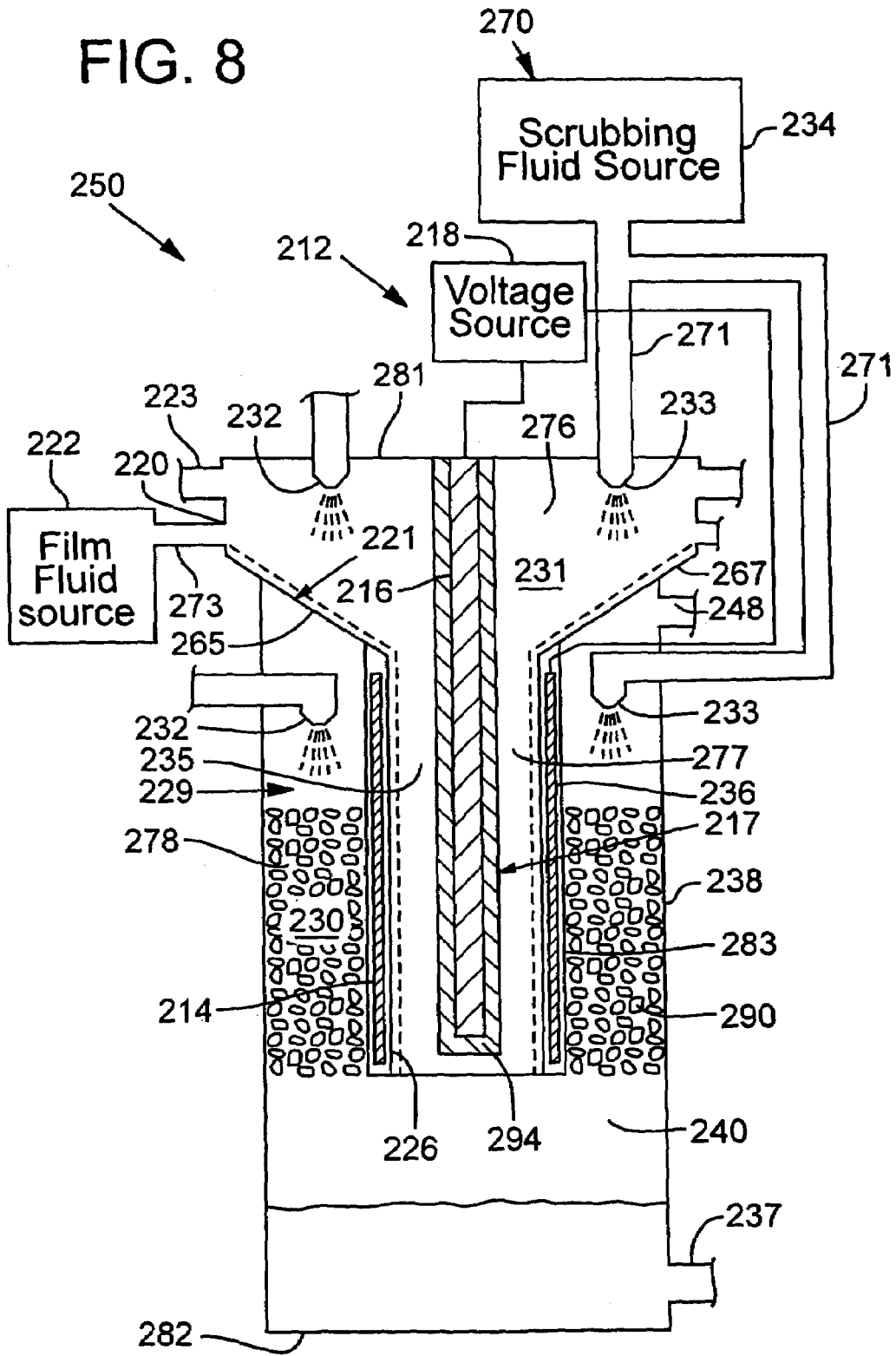
FIG. 8 is a sectional side view of a further embodiment of a plasma reactor for use in the disclosed processes.

FIG. 8 shows a further embodiment of a treatment reactor 250 that is capable of treating and abating the treatment gas comprising a plasma cell 235 and a scrubbing cell 230. The plasma cell 235 is adapted to energize the treatment gas to form a plasma in the treatment gas, thereby inducing abatement reactions and other reactions in the treatment gas. The scrubbing cell 230 is adapted to contact the treatment gas with a scrubbing fluid to scrub or remove unwanted particulates and hazardous components from the treatment gas stream. Thus, the plasma cell 235 and scrubbing cell 230 cooperate to treat the treatment gas to generate a treated flow stream that is more easily further refined or that may be released into the atmosphere without adverse environmental effects. In addition, the plasma may be formed while injecting a fluid such as water into the plasma. This provides a synergistic effect in which the water based plasma can more effectively treat the treatment gas to reduce the hazardous and toxic products therein.

The treatment reactor 250 includes a plasma cell 235 and a scrubbing cell 230 that are coaxially disposed to each other. The co-axial plasma and scrubbing cells 235, 230 are centered about the substantially same axis, and preferably, symmetrical about the axis as well. For example, at least a portion of the plasma cell 235 may be surrounded by the scrubbing cell 230, as shown in FIG. 8. Alternatively, at least a portion of the scrubbing cell 230 could be surrounded by the plasma cell 235. The coaxial plasma and scrubbing cells 230, 235 can provide a convoluted treatment flow path through the reactor 250 with a minimum footprint. This allows for a longer treatment gas residence time in the reactor 250, and consequently, improved abatement of the treatment gas. At the same time, the coaxial cells 230, 235 allow for a fairly compact shape factor thereby reducing the footprint or space required for the reactor 250 in a clean room environment. However, the treatment reactor 250 does not have to be used in the clean room and can also be placed in an external non-clean room environment such as a pumping room or otherwise, since the reactor can operate at atmospheric pressure and can potentially exhaust to atmosphere if the treated effluent is safe.

The coaxial plasma and scrubbing cells 235, 230 are defined by coaxial inner and outer tubes 236, 238. The tubes 236, 238 comprise extended hollow passageways that are arranged to define the plasma and scrubbing cells 235, 230. In the version shown in FIG. 8, the inner tube 236 forms a common wall between the scrubbing and plasma cells 230, 235 that at least partially surrounds and defines an inner passage 277 comprising the plasma cell 235, while the outer tube 238 is spaced apart from the inner tube 236 to define an outer passage 278 comprising the scrubbing cell 230 in the volume therebetween. The tubes 236, 238 comprise a cross section that is suitable for the flow of treatment gas through the treatment reactor 250, such as for example, a round, rectangular, triangular or other shape or combination of shapes. For example, the tubes 236, 238 may comprise concentric cylinders having a substantially circular cross-section that defines concentric cylindrical plasma and scrubbing chambers 235, 230. The outer tube 238 may further extend beyond the inner tube 236 and comprise capped upper and lower ends 281,282, to define a treatment gas passageway 240 that facilitates flow of the treatment gas between the cells.

The treatment gas can be introduced into the treatment reactor 250 by treatment gas inlets 223 located upstream of the plasma cell 235. The treatment gas introduced into the reactor 250 flows through the plasma cell 235 and undergoes abatement reactions induced by the plasma formed in the plasma cell 235. The plasma treated gas flows through the gas passageway 240 and into the scrubbing cell 230 where the gas is scrubbed before the treated effluent is released from the reactor 250 via the effluent outlet 248 located downstream of the scrubbing cell 230. In the version shown in FIG. 8, the treatment gas is introduced through the treatment gas inlets 223 and flown into a coaxially interior plasma cell 235. The reactor 250 comprising the coaxially interior plasma cell 235 and external scrubbing cell 230 can provide better electrical isolation of high voltage flow lines in the reactor 250, thus inhibiting short circuiting in the reactor 250. Alternatively, the treatment gas may be introduced into the internal scrubbing cell 230 before being introduced into the external plasma cell 235, or the positions of the plasma cell 235 and scrubbing cell 230 may be switched and the effluent may be introduced into the cells 230,235 in another suitable order.

The scrubbing cell 230 is adapted to treat the treatment gas by providing a scrubbing fluid to scrub or remove particulates and unwanted materials from the treatment gas, and/or to add reactive species to the treatment gas to react with and abate the treatment gas. The scrubbing fluid can also dissolve or react with materials in the treatment gas as the treatment gas travels through the scrubbing cell 230. For example, a scrubbing fluid comprising water may be introduced into a treatment gas comprising HF to dissolve the HF in the scrubbing fluid and remove the HF from the treatment gas stream. The scrubbing fluid can also remove solid particulates, such as $SiO_2$, from the treatment gas stream. The scrubbing fluid is provided to the scrubbing cell 230 by a scrubbing fluid distributor 270 comprising one or more scrubbing fluid inlets 232 connected to a scrubbing fluid source 234 by scrubbing fluid conduits 271. The scrubbing fluid distributor 270 comprises inlets 232 having nozzles 233 adapted to spray scrubbing fluid into the treatment gas stream in the scrubbing cell 230. The scrubbing fluid inlets 232 and nozzles 233 can be adapted to spray scrubbing fluid in a direction that is against or across a flow direction of the treatment flow stream, to better scrub the effluent. The scrubbing cell 230 can also optionally include scrubbing beads 290 arranged in the scrubbing cell 230, as shown in FIG. 8, that are soaked or coated in scrubbing fluid to provide a larger scrubbing surface contact area. The scrubbing fluid used to scrub the treatment gas is removed from the reactor 250 via a fluid outlet 237 located near the bottom of the reactor 250. The bottom of the reactor 250 can serve as a sump that collects and retains the scrubbed liquid. The liquid in the sump can alter the direction of the flow of treated gas so that the treated gas flows from the plasma cell 235 and into the scrubbing cell 230 via the gas passageway 240.

The scrubbing cell 230 can include a pre-scrubbing cell 231 through which the treatment gas is passed prior to treatment in the plasma cell 235. The pre-scrubbing cell 231 serves to remove unwanted particulates before the treatment gas is introduced into the plasma cell 235, as well as to add gas or fluid additives, such as reactive gas additives, that can be energized with the treatment gas in the plasma cell 235 to abate the treatment gas. The scrubbing cell 230 can also comprise a post-scrubbing cell 229 that is adapted to scrub the treated gas after treatment in the plasma cell 235. The post-scrubbing cell 229 is adapted to dissolve or wash away particulates and other unwanted materials, such as the above described HF and $SiO_2$, that may be formed as products of the plasma cell treatment. The reactor 250 can also comprise both a pre-scrubbing cell 231 and post-scrubbing cell 229 to scrub the treatment gas before and after treatment in the plasma cell 235, as shown for example in FIG. 8.

In one exemplary version, the pre-scrubbing cell 231 is disposed above one or more of the plasma and post-scrubbing cells 235,230 and is defined by a volume between the upper capped end 281 of the reactor 250 and a sidewall of the reactor 250 that cooperate to form an upper passage 276 comprising the pre-scrubbing cell 231 therebetween. For example, in the embodiment shown in FIG. 8, the prescrubbing chamber is defined by an annular sidewall 265 that is connected to an inner tube 236 surrounding an interior plasma cell 235 to allow a flow of treatment gas between the pre-scrubbing cell 231 and interior plasma cell 235. The annular sidewall 265 can be connected to the inner tube 236 via a ledge 267 that is sloped to connect to the top of the inner tube 236. The annular sidewall 265 comprises a suitably sized circumference that may be greater than that of the inner and outer tubes 236,238, or that may be smaller than one or more of the tubes 236,238 depending on size and gas flow requirements. For example, the annular sidewall 265 can define a circumference that is greater than that of the inner tube 236, and the sloped ledge 267 of the annular sidewall 265 can form at least a portion of a top wall of the post-scrubbing cell 230, as shown in FIG. 8.

The reactor 250 may optionally comprise a source of additive gas, in addition or as an alternative to the optional pre-scrubbing cell 230, that is adapted to provide a reactive gas capable of reacting with components of the treatment gas to reduce the hazardous gas content of the treatment gas.

Desirably, the additive gas is added into the treatment gas either before or in the plasma cell 235 so the additive gas can be energized to form energized species in the plasma cell 235 that react with and abate the treatment gas. In one version, a suitable additive gas comprises a reducing agent, such as for example one or more of $H_2$, $H_2O$, $NH_3$, $C_2H_4$, $CH_4$ and $C_2H_6$. In another version, the additive gas comprises an oxidizing agent, such as for example one or more of $O_2$, $O_3$, and $C_2H_3OH$. The additive gas can be provided in the reactor 250 by an additive gas inlet adjacent to the plasma cell 235 that is coupled to an additive gas source by an additive gas conduit. The additive gas inlet can also provide a non-reactive gas from the additive gas source, such as for example one or more of Ar, He, and Xe. By additive gas it is meant both gases and vaporized liquids.

The plasma cell 235 is adapted to treat the treatment gas by energizing the treatment gas and/or additive gas to form a plasma in the cell 235. The treatment gas and/or additive gas can be energized in the plasma cell 235 to form energized plasma species that initiate abatement reactions in the treatment gas to reduce a hazardous gas content of the treatment gas.

The treatment gas can be energized to form a non-thermal plasma in the plasma cell 235 by a dielectric barrier discharge energizer 212, such as a film discharge gas energizer. The dielectric barrier discharge gas energizer 212 includes one or more electrodes 214, 216 about the plasma cell 235. In the version shown in FIG. 8, the dielectric barrier discharge gas energizer 212 includes a first electrode 214 about the inner tube 236 and a second electrode 216 that extends into the volume defined by the inner tube 236. One or more of the first and second electrodes 214, 216 are coupled to a voltage source 218, such as an AC voltage source that is adapted to provide a voltage that is sufficiently high to bias the electrodes 214, 216 to energize the effluent. The voltage source 218 may be adapted to provide a voltage of at least about 10 kV, for example from about 10 kV to about 60 kV, and even about 30 kV.

The reactor 250 can also include a fluid film inlet 220 to flow a fluid over surfaces in the reactor 250, such as over the surface of at least one of the electrodes 214, 216 to form a fluid film over the electrodes 214, 216. In the version shown in FIG. 8, the inner tube 236 includes a first electrode 214 and the fluid film inlet 220 provides fluid that flows by gravity over an inner surface 226 of the inner tube 236, thereby at least partially covering the first electrode 214. The power coupled between the first and second electrodes 214, 216 through the overlying fluid film to the treatment gas generates the non-thermal plasma micro-streamers in the cell 235. In one version, the fluid film is provided by the scrubbing fluid distributor 270. In this version, the fluid film inlet 220 is connected to the scrubbing fluid source 234 via a fluid film conduit. In another version, as shown in FIG. 8, the fluid film inlet 220 is connected via the fluid film conduit 273 to a separate fluid film source 222. The fluid film inlet 220 may be located in the pre-scrubbing chamber 231, as shown in FIG. 8, or in the plasma chamber 235. Spent fluid film is removed from the reactor 250 via the fluid outlet 237. A fluid film suitable for the dielectric barrier discharge gas energizer 212 comprises, for example, one or more of $H_2O$, $H_2O_2$ and $CH_2O$ solutions. In the version shown in FIG. 8 the fluid film is formed over a first electrode 214 that is embedded in a dielectric wall 283 that forms at least a portion of the inner tube 236, to protect the first electrode 214.

One or more of the inner and outer tubes 236, 238 includes a dielectric wall 283 having the electrode embedded therein.

The dielectric wall 283 may form only a portion of the inner or outer tube 236, 238 or the tube 236, 238 may be substantially entirely made from dielectric material with an electrode embedded therein. In the version shown in FIG. 8, the first electrode 214 is embedded in a dielectric wall 283 that forms at least a portion of an inner tube 236 defining the plasma cell 235, and is electrically coupled to a second electrode 216 that extends into the interior of the plasma cell 235. The dielectric wall 283 forms a common wall between the plasma and scrubbing cells 235, 230 and protects the embedded first electrode 214 from erosion by energized gas species and other materials in the plasma and scrubbing cells 235, 230. Embedding the electrode 214 in the dielectric wall 283 can also inhibit arcing between the first and second electrodes 214, 216 while still allowing electromagnetic energy to be transmitted through the dielectric wall 283 to generate the plasma in the plasma cell 235. The dielectric wall 283 can be made of dielectric material comprising a ceramic or polymer, such as for example one or more of Teflon™ a fluoropolymer available from DuPont de Nemours, Wilmington, Del.; aluminum oxide, silicon oxide, aluminum nitride, yttrium oxide, doped ceramics, aluminum carbide, silicon carbide and composite materials. Desirably, the thickness of the dielectric material in the dielectric wall 283 covering the first electrode 214 is sufficiently thick to protect the electrode 214 from corrosion but sufficiently thin to allow electrical power to couple through the dielectric wall 283 to form the plasma. For example, the thickness of the dielectric material covering the first electrode 214 may be at least about 1 mm, for example from about 1 mm to about 5 mm. The embedded electrode 214 comprises a shape and size that is suitable for generating the plasma in the plasma cell 235. For example, the embedded electrode 214 can comprise planar sheets, rods, or rings of conductive material embedded in the dielectric wall 236.

The reactor 250 including the coaxially interior plasma cell 235 and exterior scrubbing cell 230, as shown in FIG. 8, can further include a second electrode 216 that extends a sufficient length into the volume of an interior plasma cell 235 to energize a desired volume of treatment gas in the plasma cell 235. In this version, the second electrode 216 extends from the upper capped end 281 of the reactor 250 through the pre-scrubbing cell 231 and into the plasma cell 235, and is at least partially surrounded by the inner tube 236 comprising the embedded first electrode 214. The second electrode 216 includes a rod-shaped metal electrode or other metallic structure suitable to couple energy to the treatment gas in the plasma cell 235. The second electrode 216 can also be at least partially embedded in a dielectric cover 294 that protects the embedded second electrode 216 by inhibiting corrosion of the embedded electrode and by reducing arcing between the first electrode 214 and second electrode 216. The spacing between the second electrode 216 and first electrode 214 and the thickness of the dielectric cover 294 covering the second electrode 216 are selected to coupling a desired power level to the effluent gas in the plasma cell 235. For example, a suitable spacing between the first and second electrodes 214, 216 may be from about 1 mm to about 10 mm, such as about 5 mm, to couple a power level of from about 50 Watts to about 5 kWatts to the treatment gas in the plasma cell 235. A suitable thickness of the dielectric cover 294 may be from about 0.5 mm to about 10 mm, such as about 3 mm. The dielectric cover 294 may comprise a suitable dielectric material, such as a ceramic or polymer, such as for example one or more of Teflon™ a fluoropolymer available from DuPont de Nemours, Wilmington, Del.;

aluminum oxide, aluminum nitride, yttrium oxide, doped ceramics, aluminum carbide, silicon carbide, silicon dioxide and composite material The reactor 250 can further comprise a pre-scrubbing cell 231 having improved treatment gas inlets 223 that are adapted to improve the scrubbing and abatement efficiency of the reactor 250. For example, the pre-scrubbing cell 231 can form an annular sidewall 265 defining an outer circle, and treatment gas nozzles are spaced along the outer circle that are adapted to inject the treatment gas into the pre-scrubbing cell 231 at directions that are tangential to the outer circle. The nozzles can inject the treatment gas into the pre-scrubbing chamber 231 such that the treatment gas is directed against the inside surface 221 of the annular wall 265 in the annular pre-scrubbing cell 231, thereby forming an effluent gas flow path having a circular component defined by the curved annular sidewall 265. The tangentially directed effluent may even form an effluent flow path in the pre-scrubbing chamber 231 that is substantially circular. By directing the effluent tangentially into the pre-scrubbing cell 231, the residence time of the treatment gas in the pre-scrubbing cell 231, and even in the plasma cell 235 is increased, thereby allowing for enhanced scrubbing and plasma abatement of the effluent. The pre-scrubbing cell 231 may have a size and shape that is suitable to provide a good flow of treatment gas. For the example, the pre-scrubbing cell 231 may define a cross-section having a trapezoidal shape or a triangular shape.

The fluid film inlet 220 adapted to form a fluid film over surfaces in the reactor 250 can also be positioned in the pre-scrubbing cell 231. Locating the fluid film inlet 220 in the pre-scrubbing cell 231 allows for the fluid film to scrub the treatment gas in the pre-scrubbing cell 231 to remove undesirable materials before the treatment gas is introduced into the plasma cell 235, as well as to add reactive additives from the fluid film to the treatment gas. In one version, the fluid film inlet 220 comprises an annular slit located beneath the effluent inlets 223 along annular sidewall 265 of the pre-scrubbing cell 231. The fluid film inlet 220 may also be a series of holes that are positioned adjacent to one another. Fluid film entering the pre-scrubbing cell 231 from the fluid film inlet 220 flows by force of gravity over the surface 221 of the annular wall 265 of the pre-scrubbing cell and over surfaces in the plasma cell 235. In the version shown in FIG. 8 the fluid flows from the pre-scrubbing cell 231 into an interior plasma cell 235 and over the inner surface 226 of the inner tube 236 comprising the embedded first electrode 214. The annular slit allows for a more uniform fluid film to be formed over the surface by allowing the fluid film to be flown over a larger area of the surface. The fluid film inlet 220 may even be adapted to direct the fluid into the pre-scrubbing cell 231 in a fluid flow path having a circular component to form a rotating fluid film, thereby improving the uniform coverage of the fluid film on the surfaces in the pre-scrubbing cell and plasma cell 235.

Improved scrubbing fluid inlets 232 can also be provided to enhance scrubbing of the treatment gas in the pre-scrubbing cell 231. The scrubbing fluid inlets 232 comprise nozzles 233 that are adapted to spray scrubbing fluid across the treatment gas flow path. Spraying the scrubbing fluid across the treatment gas flow path improves mixing between the treatment gas and scrubbing fluid and thereby provides better scrubbing of the treatment gas. In one version, the scrubbing fluid inlets 232 comprises nozzles 233 that are adapted to spray the scrubbing fluid in a direction that is substantially perpendicular relative to the circular component of the treatment gas flow path. For example, the scrubbing fluid nozzles 233 can direct the scrubbing fluid downward across the circular component of the treatment gas flow path. The scrubbing fluid can be introduced into the pre-scrubbing cell 231 by a scrubbing fluid distributor 270 comprising a manifold having a plurality of spaced apart inlets 232 above the treatment gas inlets 223, the scrubbing fluid inlets 232 being adapted to spray the scrubbing fluid in front of the treatment gas inlets 223 and across the effluent flow path as the treatment gas is introduced tangentially into the pre-scrubbing cell 231.

In one version, the scrubbing fluid nozzles 233 are adapted to direct a spray of scrubbing fluid away from a second electrode 216 having a dielectric cover 294 that extends into the plasma chamber 235 and towards, for example, the annular wall 265. Directing the scrubbing fluid away from the second electrode 216 may reduce the occurrence of electrical arcing between the first and second electrodes 214,216 by maintaining the surface 217 of the embedded second electrode 216 relatively dry. The spray of scrubbing fluid can be directed away from the second electrode 216 by angling the scrubbing fluid injector nozzles 233 towards the annular sidewall 265 and away from the second electrode 216. Furthermore, the spray angle of the fluid nozzles 233 can also be selected to be sufficiently narrow to avoid spraying the second electrode 216, while still providing a spray of scrubbing fluid that is sufficiently wide to interact with and scrub the treatment gas. For example, a suitable spray angle may be from about 45° to about 150°, such as about 80°, for a reactor 250 having a distance between the covered second electrode 216 and the scrubbing fluid nozzles 233 of about 10 cm. While the scrubbing fluid nozzles 233 have been described as being located in the pre-scrubbing cell 231, they may also or alternatively be used in a post-scrubbing cell 229 or any other region in the reactor 250 where a directed flow of scrubbing fluid is desired.

The scrubbing fluid inlets 232 in the pre-scrubbing cell or post-scrubbing cells 229,231 can also comprise fluid injector nozzles 233 adapted to direct the scrubbing fluid at a high velocity against a fluid impingement surface, such as a surface of a wall in scrubbing or plasma cell 230, 235. The scrubbing fluid nozzles 233 can be adapted to direct the scrubbing fluid against the fluid impingement surface at a velocity that is sufficiently high to generate a scrubbing fluid mist to scrub the treatment gas. The scrubbing fluid mist is generated because the high impact velocity causes the impinging scrubbing fluid droplets to break apart into smaller droplets. The smaller scrubbing fluid droplets have a higher ratio of droplet surface area per volume of scrubbing fluid, and thus allow for better contact with the treatment gas and a higher scrubbing efficiency.

As described above, the corrosive effect of the reduction products such as HF is substantially diminished at the lower operating temperatures of the disclosed processes. One consequence is that HF-resistant materials such as fluorinated polymers (e.g., Teflon® perfluorinated polyethylenes or polyvinylidene fluoride) can be used for parts of the plasma reactor or to coat exposed surfaces of the plasma reactor. Such materials tend to be less expensive than the specialized corrosion-resistant metal alloys required in harsher environments resulting from higher temperatures.

Figure 5:
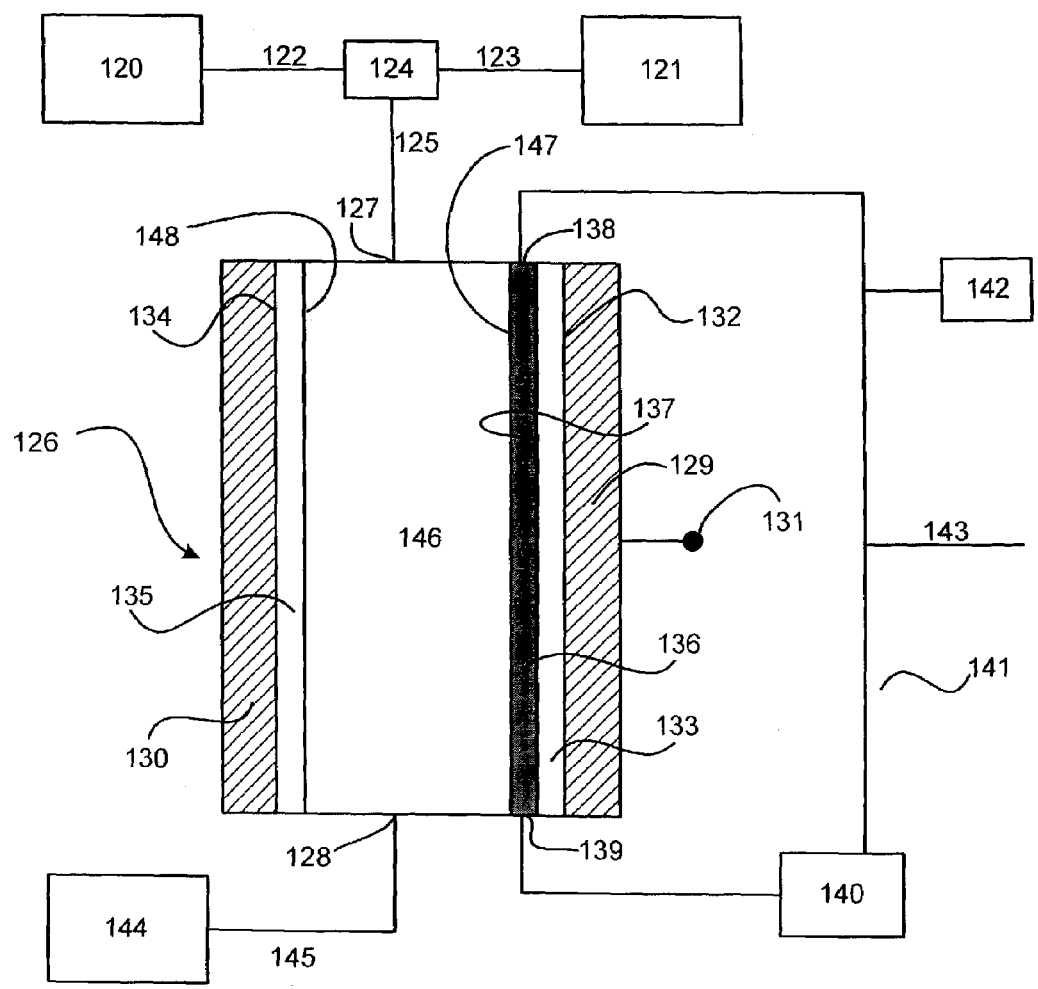
FIG. 5 is a schematic of one embodiment of a system that includes the disclosed process.

The plasma reactor may be connected to the various gas and liquid sources and exhaust gas treatment modules by any means. FIG. 5 depicts one example of a system that includes a silent-discharge, film reactor. It will be appreciated that there may be alternative arrangements of the various components of the system shown in FIG. 5. The system may also include further components such as additional gas sources or control devices such as pumps and valves.

With specific reference to FIG. 5, there is provided a treatment gas source 120 and an optional gaseous reducing agent source 121. The treatment gas source 120 and the reducing agent source 121 are connected to conduits 122 and 123, respectively. Conduits 122 and 123 optionally converge in a gas-mixing zone 124. The gas-mixing zone 124 (or conduits 122 and 123) is connected to a silent-discharge, film-discharge reactor 126 via gas conduit 125.

The reactor 126 includes at least one feed gas inlet 127 and at least one exhaust or product gas outlet 128. The exhaust gas outlet 128 is connected to a water-scrubbing unit 144 via gas conduit 145. The reactor 126 also includes a first plate electrode 129 and a second plate electrode 130 that are positioned in an opposing relationship. The first electrode 129 is operatively coupled to an AC voltage source 131 and the second electrode 130 is grounded (or connected to a low voltage source (not shown)). The first electrode 129 has an inner surface 132 upon which is disposed a first dielectric barrier 133. The second electrode 130 has an inner surface 134 upon which is disposed a second dielectric barrier 135. A liquid film 136 flows along the length of an inner surface 137 of the first dielectric barrier 133. A gap 146 is defined between an inner surface 147 of the liquid film 136 and an inner surface 148 of the second dielectric barrier 135. The electrodes 129, 130, dielectric barriers 133, 135, and liquid film 136 may be made from the materials described above.

The reactor 126 includes an inlet port 138 and an outlet port 139 for the liquid. The outlet port 139 may be fluidly connected to a liquid reservoir 140. The liquid reservoir 140 is fluidly connected to the inlet port 138 via a liquid recycling loop 141. A fresh liquid source 142 and a liquid purge conduit 143 are fluidly connected to the liquid recycling loop 141. Waste water from the water-scrubbing unit 144 may be recycled back through the liquid recycling loop 141.

During operation the treatment gas (e.g. $F_2/N_2$) flowing through gas conduit 122 will optionally mix in the gas-mixing zone 124 with the reducing agent gas (e.g., $H_2$) flowing through conduit 123. The resulting feed gas mixture from the gas-mixing zone 124 will flow through conduit 125 and gas inlet 127 into gap 146 of the reactor 126. An AC voltage will be applied to the first electrode 129 to generate a non-thermal plasma in the feed gas mixture flowing through the gap 146. The liquid film 136 (e.g., water) will flow down along the length of the inner surface 137 of the first dielectric barrier 133. The reduction reaction in the non-thermal plasma will occur at or near the inner surface 147 of the liquid film 136. The heat produced by the reduction reaction may be absorbed by the liquid film 136. In addition, water-soluble reaction products (e.g., HF) may dissolve into the liquid film 136. Liquid that includes a sufficient concentration of dissolved reaction products may be removed from the system via the liquid purge conduit 143. The gas exiting the reactor 126 through the exhaust gas outlet 128 may include reaction products (e.g., HF) and any non-reacted inert gases (e.g., $N_2$). The water-soluble reaction product(s) are then treated in the water-scrubbing unit 144.

Control of such a system exemplified by FIG. 5 may be implemented by any of the techniques well known in process control. For example, a sensor may be placed in an appropriate location in the system to monitor the relevant parameters of the treatment gas, particularly the halogen concentration. Data from this sensor may be inputted into a computer controller that determines the appropriate responsive settings for other operating parameters of the system (e.g., reducing agent concentration, voltage to the plasma reactor electrode, water flow rate, etc.). The controller then generates instruction signals to the control devices for each such operating parameter.

One such sensor could be placed at the treatment gas inlet into the chamber for measuring the halogen concentration and adjusting the amount of reducing agent and liquid flow rate accordingly. For example, in the system of FIG. 5 a sensor for detecting halogen concentration may be operatively coupled to gas conduits 122, 123 and/or 125 and to liquid recycling loop 141. Another useful parameter for monitoring may be the voltage and current measured from the high voltage electrode to the ground electrode. For example, in the system of FIG. 5 a voltage probe may be operatively coupled to the first electrode 129 and a sensing capacitor may be operatively coupled to the second electrode 130. A method for obtaining the plasma power input with such a probe-and-capacitor arrangement is described in Rosenthal, L. and Davis, D., "Corona Discharge for Surface Treatment", IEEE Transactions of Industry Applications, I-5, 328 (May/June 1975).

As mentioned above, the disclosed process is especially suitable for treatment of effluent streams from semiconductor manufacturing processes such as plasma etch, plasma-enhanced chemical vapor deposition and plasma-assisted chamber cleaning processes. In such manufacturing processes there is often a dry or roughing pump or similar device located downstream of the etch or deposition process tool that dilutes the effluent with an inert gas such as nitrogen. According to one embodiment of the disclosed process, the plasma reactor for carrying out the process is located downstream from such an inert gas source and, thus, $N_2$ (or other inert gas) constitutes a substantial portion of the treatment feed gas mixture. In other words, this specific embodiment is not a so-called "point-of use" abatement system since it is not treating the effluent stream immediately after it exists the etch or deposition chamber.

The specific examples described below are for illustrative purposes and should not be considered as limiting the scope of this disclosure.

EXAMPLE 1

Figure 6:
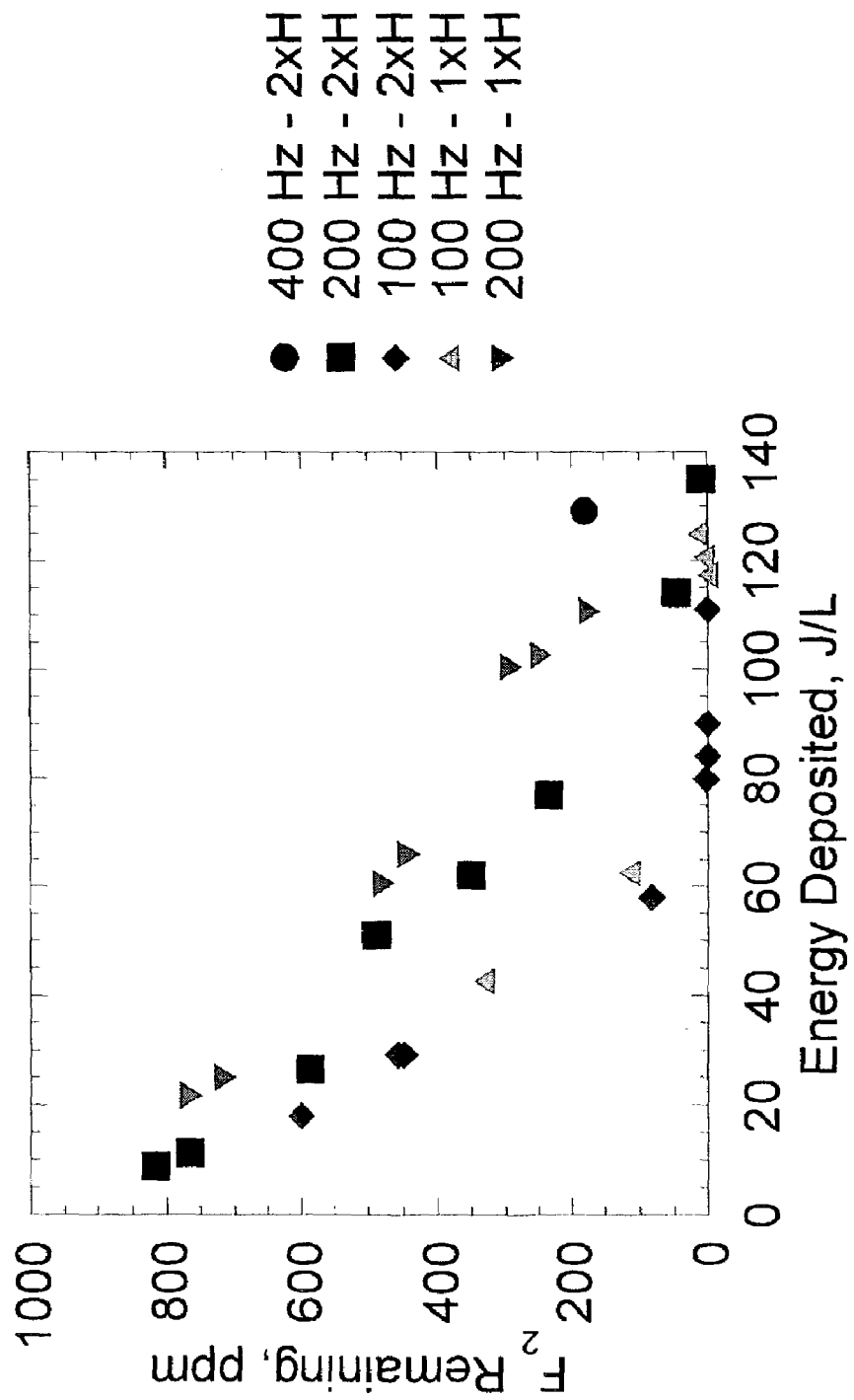
FIG. 6 is a graph depicting the amount of remaining $F_2$ vs. applied plasma energy according to examples of one embodiment of the disclosed process.

A treatment gas containing 1000 ppm $F_2$ in $N_2$ background gas was mixed with various $H_2$ streams (at a 1:1 $H_2:F_2$ molar ratio and a 2:1 $H_2:F_2$ molar ratio). The treatment gas and $H_2$ were supplied at ambient temperature and pressure. The resulting feed gas mixtures were introduced into the annular gap of a silent discharge plasma reactor having a configuration as shown in FIG. 4. A non-thermal plasma was generated in the feed gas mixtures with AC voltages having different frequencies applied to the high voltage electrode (400 Hz, 200 Hz and 100 Hz). The reactor temperature ranged from 30-35° C. The resulting amount of $F_2$ in the exhaust gas stream and energy required is shown in the graph of FIG. 6.

EXAMPLE 2

Figure 7:
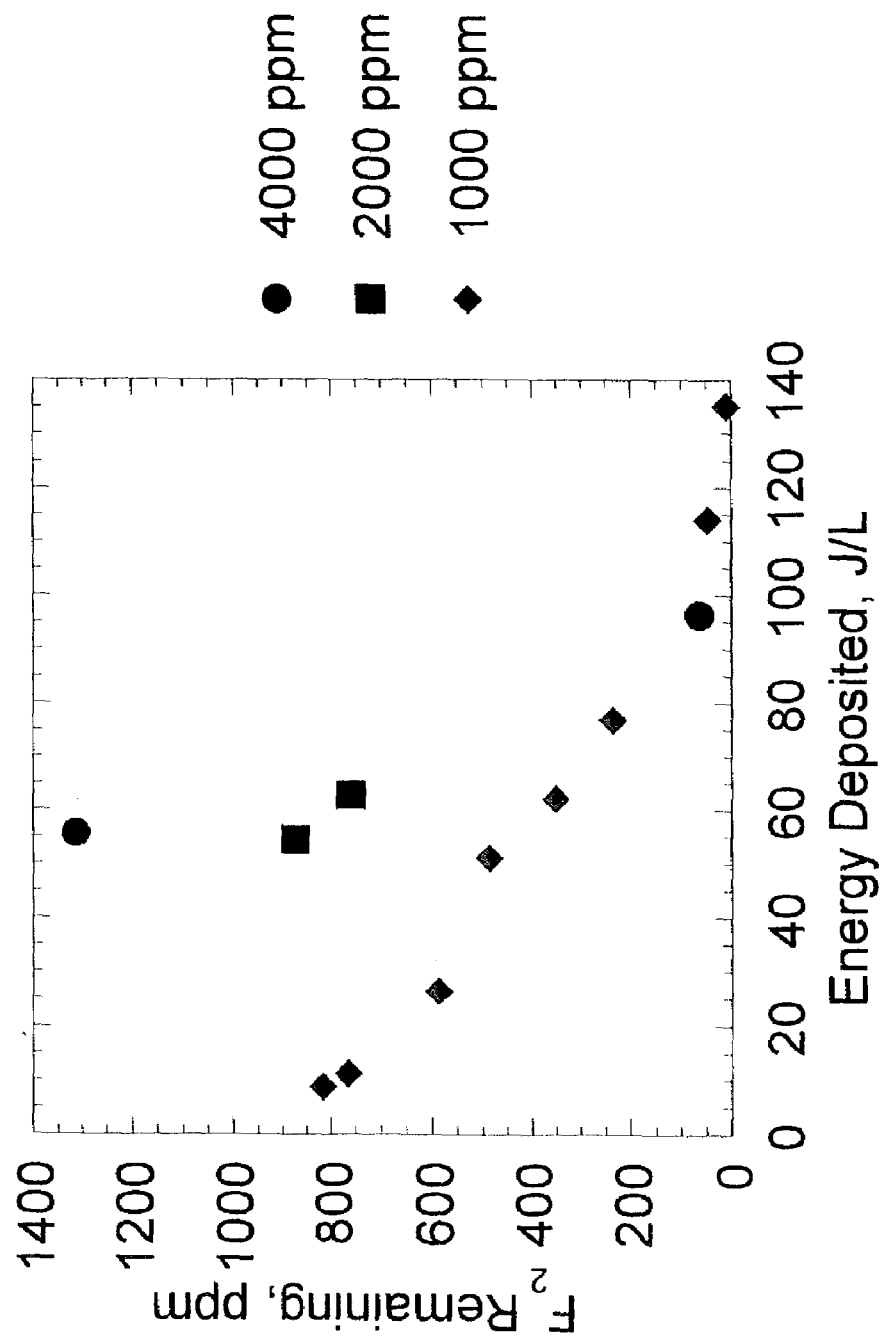
FIG. 7 is a graph depicting the amount of remaining $F_2$ vs. applied plasma energy according to additional examples of one embodiment of the disclosed process.

Treatment gases containing 4000, 2000, or 1000 ppm $F_2$ in $N_2$ background gas were mixed an $H_2$ stream at a 2:1 $H_2:F_2$ molar ratio. The treatment gas and $H_2$ were supplied at ambient temperature and pressure. The resulting feed gas mixtures were introduced into the annular gap of a silent discharge plasma reactor having a configuration as shown in FIG. 4. A non-thermal plasma was generated in the feed gas mixtures with a 200 Hz AC voltage applied to the high voltage electrode. The reactor temperature ranged from 30-35° C. The resulting amount of $F_2$ in the exhaust gas stream and energy required is shown in the graph of FIG. 7.

Having illustrated and described the principles of our disclosure with reference to several embodiments, it should be apparent to those of ordinary skill in the art that the invention may be modified in arrangement and detail without departing from such principles.

What is claimed is:

1. A process for treating a halogen-containing gas, comprising:
    introducing a halogen-containing gas into a reactor;
    introducing a liquid reducing agent into the reactor;
    vaporizing a portion of the liquid reducing agent in the reactor;
    generating a non-thermal plasma in the reactor in the presence of a non-vaporized portion of the liquid reducing agent to reduce the halogen-containing gas; and
    removing the resulting reduction product from the reactor, wherein the non-vaporized portion of the liquid reducing agent forms a liquid region with a liquid surface facing an interior of the reactor.

2. The process according to claim 1, wherein the non-vaporized portion of the liquid reducing agent flows through the reactor during generation of the non-thermal plasma.

3. The process according to claim 1, wherein the liquid reducing agent is selected from water, a high vapor pressure hydrocarbon, an olefin, or a reducing agent dissolved in a liquid carrier.

4. The process according to claim 3, wherein the liquid reducing agent comprises water.

5. The process according to claim 1, wherein the vaporizing of a portion of the liquid reducing agent is effected by the liquid reducing agent absorbing heat produced by the reduction of the halogen-containing gas.

6. The process according to claim 1, wherein the non-thermal plasma comprises a silent discharge plasma.

7. The process according to claim 2, wherein the resulting reduction product comprises at least one water-soluble halogen-containing substance, and the removing of the resulting reduction product from the reactor comprises dissolving the water-soluble halogen-containing substance in the non-vaporized portion of the liquid reducing agent and discharging the resulting solution from the reactor.

8. A continuous process for treating a halogen-containing gas, comprising:
    providing a reactor defining at least one gas inlet for receiving a halogen-containing gas, and at least one inlet for receiving a liquid reducing agent;
    providing at least one first electrode and at least one second electrode disposed within the reactor;
    flowing the liquid reducing agent over at least a portion of the first electrode;
    vaporizing a portion of the liquid reducing agent in the reactor; and
    applying electric potential to at least one of the first electrode or the second electrode so as to generate a plasma that reduces the halogen-containing gas in the continuous presence of a non-vaporized portion of the liquid reducing agent.

9. The process according to claim 8, wherein a dielectric barrier is disposed on a surface of the first electrode, and the generated plasma comprises a non-thermal plasma.

10. The process according to claim 8, wherein the liquid reducing agent is selected from water, a high vapor pressure hydrocarbon, an olefin, or a reducing agent dissolved in a liquid carrier.

11. The process according to claim 8, wherein reducing the halogen-containing gas produces a reaction product mixture that includes a water-soluble halogen-containing reduction product, the process further comprising separating the water-soluble halogen-containing reduction product from the reaction product mixture.

12. The process according to claim 11, wherein the separating comprises aqueous scrubbing.

13. The process according to claim 11, the process further comprising dissolving the water-soluble halogen-containing reduction product into the liquid reducing agent.

14. The process according to claim 13, further comprising adding at least calcium hydroxide or sodium hydroxide to the liquid reducing agent.

15. The process according to claim 7, further comprising adding at least calcium hydroxide or sodium hydroxide to the liquid reducing agent.

16. A process for treating $F_2$ gas, comprising:
    introducing $F_2$ gas into a chamber;
    introducing a liquid reducing agent into the chamber;
    vaporizing a portion of the liquid reducing agent in the chamber;
    generating a non-thermal plasma in the chamber in the presence of a non-vaporized portion of the liquid reducing agent to reduce the $F_2$ gas into hydrogen fluoride; and
    removing the resulting hydrogen fluoride from the chamber, wherein the non-vaporized portion of the liquid reducing agent forms a liquid region with a liquid surface facing an interior of the chamber.

17. The process according to claim 16, wherein the non-vaporized portion of the liquid reducing agent flows through the chamber during generation of the non-thermal plasma.

18. The process according to claim 16, wherein the liquid reducing agent is selected from water, a high vapor pressure hydrocarbon, an olefin, or a reducing agent dissolved in a liquid carrier.

19. The process according to claim 18, wherein the liquid reducing agent is water.

20. The process according to claim 16, wherein the vaporizing of a portion of the liquid reducing agent is effected by the liquid reducing agent absorbing heat produced by the reduction of the $F_2$ gas.

21. The process according to claim 1, wherein the non-thermal plasma is generated at a temperature less than or equal to about 100° C.

22. The process according to claim 1, wherein the liquid region is contiguous with an inner surface of the reactor.

* * * * *